United States Patent [19]
Fischer et al.

[11] Patent Number: 6,152,275
[45] Date of Patent: *Nov. 28, 2000

[54] METHOD OF AND APPARATUS FOR DETECTING FRICTION HEAT OF A CLUTCH AND REGULATING THE CLUTCH

[75] Inventors: Robert Fischer; Thomas Jäger, both of Bühl; Martin Zimmermann, Sasbach, all of Germany

[73] Assignee: Luk Getriebe-Systeme GmbH, Buhl/Baden, Germany

[ * ] Notice: This patent is subject to a terminal disclaimer.

[21] Appl. No.: 09/086,376

[22] Filed: May 28, 1998

Related U.S. Application Data

[62] Division of application No. 08/592,855, Jan. 24, 1996, Pat. No. 5,823,912.

[30] Foreign Application Priority Data

Jan. 28, 1995 [DE] Germany ............................ 195 02 701

[51] Int. Cl.$^7$ ...................................................... F16D 11/00
[52] U.S. Cl. ........................ 192/82 T; 477/174; 477/175; 477/176
[58] Field of Search .............................. 192/82 T, 109 F; 477/166, 174, 175, 176; 701/67, 68

[56] References Cited

U.S. PATENT DOCUMENTS

| | | | |
|---|---|---|---|
| 4,081,065 | 3/1978 | Smyth et al. | 477/176 |
| 4,576,263 | 3/1986 | Lane et al. | 477/72 |
| 4,621,722 | 11/1986 | Page et al. | 477/175 X |
| 4,623,052 | 11/1986 | Watanabe et al. | 477/175 X |
| 4,722,426 | 2/1988 | Bellanger | 477/175 |
| 4,722,429 | 2/1988 | Kono | 477/175 |
| 5,337,866 | 8/1994 | Sturmer et al. | 192/82 T X |

*Primary Examiner*—Khoi Q. Ta
*Attorney, Agent, or Firm*—Darby & Darby

[57] ABSTRACT

There are disclosed a method of and an apparatus for regulating the operation of a friction clutch or another torque transmission system in the power train of a motor vehicle. The regulation is such that the operator of the vehicle is informed of a prevailing or impending condition which entails or is about to entail damage to the system or to the entire power train. Such situation can arise in response to excessive and/or prolonged slip of abutting friction surfaces in a friction clutch, overheating of one or more parts of the system for any other reason(s), as a result of improper selection of the transmission speed for starting of the vehicle and/or due to excessive wear upon the friction linings and/or other parts. The remedial undertaking can include such regulation of the system that the ride become uncomfortable to the occupant(s) of the vehicle and/or automatic elimination of the cause(s) of unsatisfactory torque transmission.

43 Claims, 10 Drawing Sheets

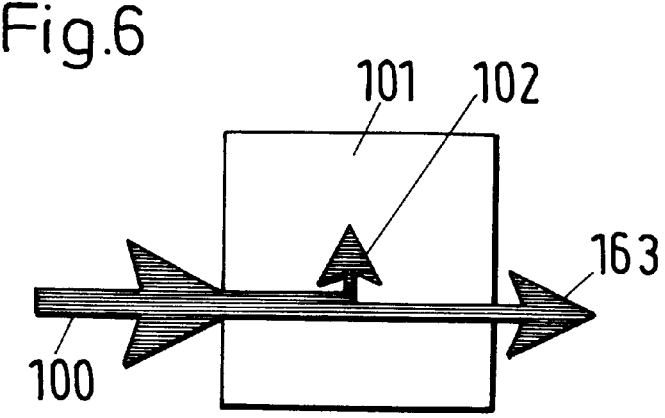
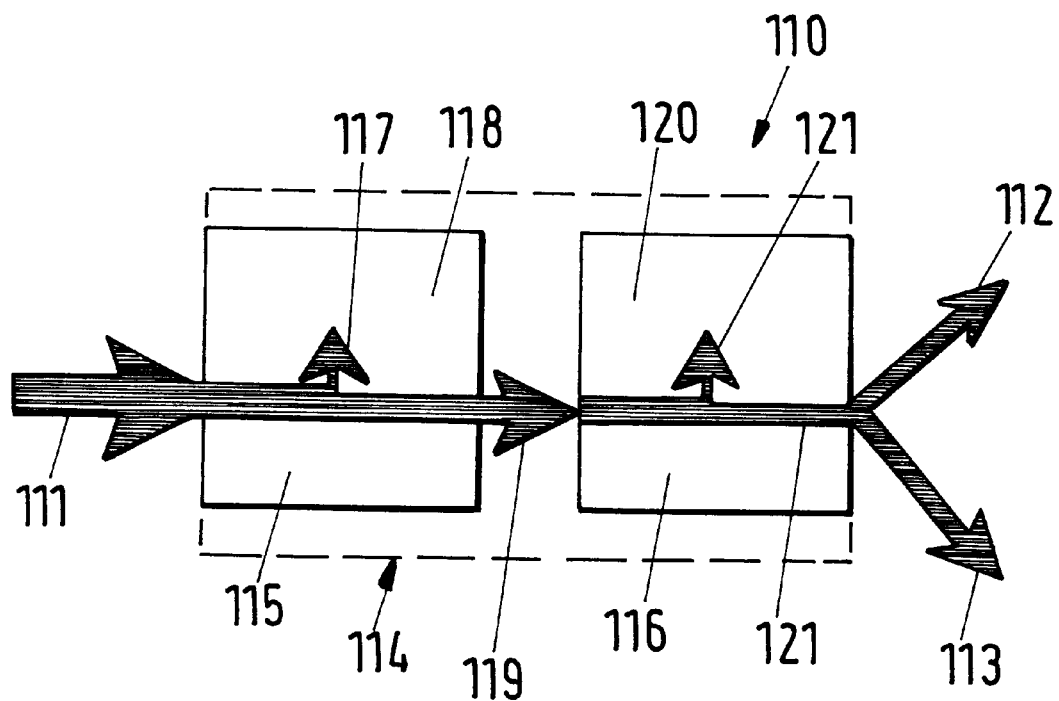

METHOD OF AND APPARATUS FOR DETECTING FRICTION HEAT OF A CLUTCH AND REGULATING THE CLUTCH

CROSS-REFERENCE TO RELATED APPLICATION

This patent application is a divisional of application Ser. No. 08/592,855, filed Jan. 24, 1996, now U.S. Pat. No. 5,823,912, granted Oct. 20, 1998, the disclosure of which is incorporated herein by reference.

BACKGROUND OF THE INVENTION

The invention relates to improvements in methods of and apparatus for regulating the operation of clutches and other types of torque transmission systems. More particularly, the invention relates to improvements in methods of and in apparatus for regulating the operation of torque transmission systems which are installed in power trains between prime movers and variable-speed or variable-ratio assemblies, such as between the clutches and the manual or automatic transmissions in the power trains of motor vehicles. Still more particularly, the invention relates to the transmission of torque between a prime mover (such as a combustion engine) and a variable-speed assembly (such as a manual transmission in the power train of a motor vehicle) by a system (such as a friction clutch) the operation of which can be regulated by an adjustable device in response to variations of the intensity and/or other characteristics of one or more signals.

It is often desirable to regulate the operation of torque transmission systems (such as various types of clutches including friction clutches and lockup or bypass clutches which are utilized in conjunction with hydrokinetic torque converters) in order to account for changes in the condition of one or more prime movers serving to supply torque to the torque transmission system, for changes in the condition and/or mode of operation of the assembly or assemblies receiving torque from the torque transmission system and/or for changes in the condition and/or mode of operation of the torque transmission systems, e.g., to account for the wear upon and/or for changes in the temperature of a torque transmission system including or constituting a friction clutch between the engine and the transmission in the power train of a motor vehicle. Proposals to carry out such regulation include the utilization of computer-controlled clutch managements which can influence the torque transmission system by way of a device known as actor.

Torque transmission systems which can be regulated in accordance with the present invention include, among others, various types of clutches which are designed in such a way that their rotary input and output members can slip relative to each other to a selected extent, i.e., that their input and output members can turn with reference to each other. Such slip can entail a more or less pronounced wear upon the abutting surfaces of the input (driving) and output (driven) members and the development of heat which involves a more or less pronounced thermal stressing of the torque transmission system. All of these factors must be taken into consideration if the torque transmission system is to operate satisfactorily for extended periods of time, e.g., during the useful life of a motor vehicle.

A proposal to regulate the operation of a torque transmission system between a prime mover and a variable-speed assembly is disclosed in published German patent application No. 36 24 008. This publication proposes to ascertain the friction performance of the torque transmission system and to generate a warning (alarm) or blocking (stoppage) signal in response to detection that the monitored friction performance exceeds a predetermined maximum permissible value. The thus obtained signal or signals can be utilized to eliminate and/or to otherwise influence the cause or causes of excessive friction performance.

In accordance with a proposal which is disclosed in the commonly owned U.S. Pat. No. 5,176,234, the torque transmission system (such as a friction clutch) is blocked when the magnitude of the monitored friction performance exceeds a preselected maximum permissible value.

All in all, heretofore known proposals to regulate the operation of a torque transmission system (such as a friction clutch) between a torque supplying prime mover (such as a combustion engine) and a torque receiving assembly (such as a manual transmission) in the power train of a motor vehicle involve the generation of an optical or acoustical signal which is transmitted to the operator of the motor vehicle embodying the torque transmission system or a certain adjustment of the torque transmission system, such as more pronounced engagement, full engagement, less pronounced engagement or full disengagement of a friction clutch.

OBJECTS OF THE INVENTION

An object of the invention is to provide a method which can be resorted to in order to prolong the useful life of a regulatable torque transmission system and of the power train in which such system is being put to use.

Another object of the invention is to provide a method which renders it possible to account or to compensate for excessive wear and/or excessive thermal stressing of a torque transmission system, such as a clutch in the power train of a motor vehicle.

A further object of the invention is to provide a method which renders it possible to minimize the wear upon and/or the thermal stressing of a torque transmission system between a prime mover and a variable-speed assembly, such as between the combustion engine and the manual or automatic transmission in the power train of a motor vehicle.

An additional object of the invention is to provide a method which can be resorted to for influencing the dynamic behavior of a motor vehicle in order to prevent excessive wear upon and/or excessive thermal stressing of the clutch between the transmission and the engine.

Still another object of the invention is to provide a method which renders it possible to safely operate a vehicle even after detection of a situation which, in the absence of any undertakings to the contrary, is apt to result in more or less pronounced damage to the torque transmission system and/or other constituents of the power train.

A further object of the invention is to provide a method which renders it possible to warn the operator of a vehicle that the operation of the torque transmission system must be or is being changed in order to avoid any damage or appreciable damage or further damage to the torque transmission system and/or other parts of the power train in a motor vehicle.

Another object of the invention is to provide a method which renders it possible to warn the operator of a motor vehicle that the operation of the torque transmission system is taking place while the torque transmission system and/or certain other constituents of the power train are subject to excessive or undesirable thermal and/or mechanical stresses.

An additional object of the invention is to provide a method of regulating the operation of a clutch in a motor vehicle which enables the operator of the vehicle to undertake all necessary steps to avoid further excessive thermal and/or mechanical stressing of the clutch and/or certain other constituents of the power train in good time before such stressing could cause permanent damage to the affected constituent or constituents of the power train in the motor vehicle.

Still another object of the invention is to provide a novel and improved apparatus for the practice of the above outlined method.

A further object of the invention is to provide a novel and improved arrangement for regulating the operation of a torque transmission system between a prime mover and a variable-speed assembly, such as between the combustion engine and the transmission of a motor vehicle.

Another object of the invention is to provide a power train which embodies a torque transmission system and the above outlined regulating arrangement.

An additional object of the invention is to provide a novel grouping or set of signals which can be utilized to influence the operation of a clutch and/or other types of torque transmission systems in order to prevent undesirable mechanical and/or thermal stressing of such systems.

Still another object of the invention is to provide a novel and improved control unit which is designed to process the signals and to influence the device or devices which directly influence or regulate the operation of a torque transmission system, such as a friction clutch in the power train of a motor vehicle.

A further object of the invention is to provide a motor vehicle which embodies the above outlined arrangement or apparatus as a means for influencing or regulating the operation of a torque transmission system in the power train of the vehicle.

Another object of the invention is to provide a reliable and long-lasting clutch for use in the power train of a motor vehicle.

SUMMARY OF THE INVENTION

One feature of the present invention resides in the provision of a method of regulating the operation of a torque transmission system, such as a clutch, having heat generating friction surfaces, with a regulating device which is operable by a control unit. The method comprises the steps of transmitting to the control unit signals which denote at least the magnitude of torque being transmitted by the torque transmission system, the extent of slip of the system, the condition of the system and/or of a structure (such as a motor vehicle) in which the system is put to use, and the selected speed of a variable-speed assembly (e.g., a manual or automatic transmission) receiving torque from the system, utilizing at least one of the above enumerated signals to influence the input of energy by the control unit into the friction surfaces of the torque transmission system, monitoring the temperature of at least a portion of the torque transmission system as a function of time, comparing the monitored temperature with a threshold value, and utilizing the control unit to regulate the operation of the torque transmission system under at least one of the circumstances including (a) detection of a monitored temperature which exceeds the threshold value and (b) starting of or an attempt to start a prime mover for the torque transmission system at a speed of the variable-speed assembly above a predetermined maximum starting speed. The utilizing step can include generating at least one signal denoting at least one of (i) excessive thermal stressing of the torque transmission system and (ii) the need for the initiation of a corrective undertaking. In fact, such signal can serve for direct initiation of a corrective undertaking such as a full engagement, a more pronounced engagement, a full disengagement or a less pronounced engagement of a friction clutch.

The utilizing step can include selecting for the torque transmission system a mode of operation involving the transmission of torque within a range of torques above and below a predetermined or preselected median value. This can involve the selection of higher and/or lower values of transmittable torque as compared with the originally selected torque which can be transmitted without fluctuations.

The utilizing step can also include selecting for the torque transmission system a mode of operation which varies as a function of time, periodically or aperiodically to result in fluctuations of transmitted torque.

Still further, the utilizing step can include generating at least one signal denoting at least one of: excessive energy input, excessive monitored temperature, excessive thermal stressing of at least a portion of the torque transmission system and excessive wear at least upon the torque transmission system.

Another feature of the invention resides in the provision of an apparatus for regulating the operation of a torque transmission system (such as a friction clutch, a lockup clutch or another type of clutch) having heat generating friction surfaces and being installed in a power train between a prime mover (such as a combustion engine) and a variable-speed assembly (such as a transmission) in a motor vehicle. The improved apparatus comprises an adjustable device (e.g., a device including fluid-operated master and slave cylinders) which is operable to select the torque adapted to be transmitted by the torque transmission system, and means for adjusting the aforementioned device. The adjusting means comprises a control unit (such as a computer) having input means connected with at least one of a plurality of signal supplying components such as sensor means for supplying signals denoting at least one of several variable parameters indicating the condition of the vehicle, the magnitude of transmitted torque and the extent of slip of the friction surfaces of the torque transmission system relative to each other. The control unit includes means for ascertaining on the basis of the aforementioned signals and as a function of time: (a) a friction energy input at the friction surfaces and (b) at least one temperature of the torque transmission system, for comparing the at least one temperature with at least one predetermined threshold value, and for carrying out at least one of a plurality of undertakings including generating output signals denoting excessive thermal stressing of the torque transmission system and initiating correcting and/or protective measures when the at least one temperature of the torque transmission system exceeds the at least one predetermined threshold value.

A further feature of the invention resides in the provision of an apparatus for regulating the operation of a torque transmission system (such as a clutch having heat generating friction surfaces) which is installed in a power train between a prime mover (such as an internal combustion engine) and a variable-speed assembly (such as a manual or an automatic transmission having first, second and additional forward speeds as well as a reverse speed) in a motor vehicle. The apparatus comprises an adjustable device which is operable to select the torque to be transmitted by the torque transmission system, and means for adjusting the device including a control unit, such as a computer. The adjusting means has input means connected or connectable with at least one of a plurality of signal supplying components such as sensor means for supplying signals denoting at least one of several variable parameters indicating the condition of the vehicle, the magnitude of transmitted torque and the extent of slip between the friction surfaces of the torque transmission system or the selected or then effective speed of the transmission. The control unit includes means for ascertaining on the basis of signals denoting the speed of the transmission and the condition of the vehicle whether or not the transmission is set in an additional forward speed (such as a third or fourth forward speed) for starting of the vehicle, and for carrying out at least one of a plurality of undertakings including generating output signals denoting excessive thermal stressing of the torque transmission system due to starting of the vehicle at an additional speed of the transmission (i.e., at a speed other than the first or second forward speed or the reverse speed) and for initiating corrective and/or protective measures when the temperature of at least a portion of the torque transmission system (e.g., of a flywheel and/or a pressure plate and/or a clutch disc or clutch plate in a friction clutch) exceeds a predetermined threshold value.

An additional feature of the invention resides in the provision of an apparatus for regulating the operation of a torque transmission system (such as a friction clutch having heat generating friction surfaces which can slip relative to each other in the partly engaged or partly disengaged condition of the clutch) which is installed in a power train between a prime mover (such as an engine) and a variable-speed or variable-ratio assembly (such as a transmission having first, second and additional forward speeds as well as a reverse speed) in a motor vehicle. The apparatus comprises an adjustable device which is operable to select the torque being transmitted by the torque transmission system, and means for adjusting the device including a control unit, such as a computer, having input means connected or connectable with at least one of a plurality of signal supplying components such as sensor means for supplying signals denoting at least one of several variable parameters indicating the condition of the vehicle, the speed of the transmission, the magnitude of the transmitted torque or the extent of slip of the friction surfaces of the torque transmission system relative to each other. The control unit includes means for ascertaining on the basis of at least one of the signals denoting the magnitude of transmitted torque, the extent of slip and the condition of the vehicle: (a) a friction energy input at the friction surfaces as a function of time and (b) at least one temperature of the torque transmission system, for comparing the at least one temperature with at least one predetermined threshold value, and for carrying out at least one of a plurality of undertakings including evaluating the signals denoting the speed of the transmission and the condition of the vehicle and generating output signals denoting excessive thermal stressing of the torque transmission system due to starting of the vehicle at an additional (such as third or fourth forward) speed of the transmission, and initiating corrective and/or protective measures when the at least one monitored temperature exceeds the at least one predetermined threshold value.

Still another feature of the invention resides in the provision of an apparatus for regulating (such as selecting) the transmission of torque by a torque transmission system (such as a clutch having heat generating friction surfaces which can slip relative to each other in the partly engaged or partly disengaged condition of the clutch) which is installed in a power train between an engine and a multispeed transmission of a vehicle. The improved apparatus comprises a central control unit (such as a computer) having input means connected or connectable with at least one of a plurality of signal supplying components or constituents such as sensor means for supplying signals denoting at least one of several variable parameters indicating the condition of the vehicle, the speed of the transmission, the magnitude of transmitted torque or the extent of slip of the friction surfaces of the torque transmission means relative to each other. The control unit has means for determining on the basis of data and other system parameters at least one of (a) the friction energy input at least within a given range of operation of the torque transmission system, (b) the temperature of at least a portion of the torque transmission system and (c) critical conditions of the vehicle including asscertaining, either in advance as a result of calculation or on the basis of at least one of the aforementioned signals, excessive energy input at least within a given range of operation of the torque transmission system or an excessive temperature at least within a given range of operation of such system or a condition of excessive wear upon the system. The control unit further comprises means for selecting the torque which is transmittable by the system as a function of time when the ascertained temperature and/or the ascertained energy input and/or the duration of the application of excessive energy input and temperature exceeds a predetermined threshold value and for indicating at least one of excessive stressing, excessive wear upon the system and excessive temperature of the system.

The aforementioned output signals can include a single type of signals or two or more different signals, for example, visible (optical) and/or audible (acoustical) signals.

The output signals can denote excessive thermal stressing of at least a predetermined portion of the torque transmission system (e.g., of the pressure plate in a friction clutch), and such output signals can be utilized to effect an adjustment of the adjustable device for the selection of a torque which varies as a function of time and entails a vibration of the power train, for example, a periodical, aperiodical and/or statistical vibration.

The arrangement can be such that the torque selecting device of the improved apparatus is adjustable by the control unit to modulate the torque which is transmissible by the clutch or another torque transmission system so that the modulated torque fluctuates as a function of time. A curve denoting the modulated torque can be a sawtooth shaped curve and can have a fixed amplitude or a variable amplitude.

The torque which is selected by the adjustable device of the improved apparatus can vary within a range including torque above as well as below a median value. The median value can be a value within a second range including torques which match, which exceed and which are less than an initial value of the torque.

The torque which is selected by the adjustable device in response to adjustment of such device by the control unit can fluctuate as a function of time in accordance with one of a plurality of patterns including periodical, aperiodical and statistical fluctuations.

The aforementioned undertakings can include effecting fluctuations of torque in such a way that a ride in the vehicle is uncomfortable (or at least unusual) to the occupant or occupants of the vehicle. For example, one of the undertakings can include causing the adjustable device to select a torque which entails more and/or less pronounced vibrations of the entire vehicle.

The output signals can be calculated or otherwise selected in such a way that they are a function of signals denoting at least the extent of slip of abutting friction surfaces relative to each other (at least in the torque transmission system) and of signals which denote the magnitude of transmitted or transmissible torque.

The means for ascertaining the friction energy input and the at least one temperature can be designed in such a way that it is responsive to at least one of a plurality of input signals including signals denoting the RPM of the prime mover (e.g., the RPM of a crankshaft or a camshaft which is driven by the internal combustion engine of a motor vehicle), the position of a valve (such as a throttle valve) for the prime mover, the (subatmospheric) pressure in the intake manfold of the prime mover, the input RPM of the transmission or another variable- multi-speed assembly, the output RPM of such assembly, the condition of at least one auxiliary consumer (e.g., the air conditioner or the generator) in the vehicle, readings of one or more tachometer generators (e.g., to ascertain the RPM of the wheels of the motor vehicle), the position of an actuator of the torque transmission system, the magnitude of transmissible torque, the torque which is being transmitted by the prime mover, and the information furnished by one or more thermometers.

The ascertaining means of the control unit can be constructed and assembled to generate the output signals in advance and such ascertaining means can be responsive to at least one of input signals denoting or indicating a critical condition of the vehicle such as starting of the vehicle at a speed of the variable-speed assembly higher than a second forward speed of such assembly, bringing the vehicle to a halt on a sloping road surface while the torque transmission system is at least partially engaged to transmit at least some torque in the absence of the application of a hand brake, a foot brake and/or any other brake, starting or driving of the vehicle along a sloping road surface while the torque transmission system is set for operation with at least some slip, and an attempt to start the vehicle while the wheels (e.g., at least the driven wheels) are being blocked against rotation.

Furthermore, the ascertaining means of the control unit can be responsive to at least one of a plurality of signals which indicate a critical condition of the vehicle such as that the friction energy input exceeds a predetermined maximum permissible value and/or a pronounced wear upon one or more components of the torque transmission system. Such plurality of signals can include signals denoting a selected speed of the variable-speed assembly (e.g., a manual transmission), the position of a first brake (such as a hand brake), the position of a second brake (such as a foot brake), the extent (if any) of inclination of the vehicle on an upwardly or downwardly sloping road surface, the RPM of the vehicle wheels, the RPM of the prime mover, the input RPM of the variable-speed assembly, the position of an actuator in the torque transmission system, the position of the throttle valve in or for the prime mover, the position of a gas pedal or another load lever in the vehicle, the torque which is being transmitted by the prime mover and the magnitude of transmissible torque. Such control unit preferably further comprises means for comparing the at least one signal of the just enumerated plurality of signals with data in at least one memory of the control unit.

The output signals furnished by the control unit can be utilized to effect an adjustment of the aforementioned device in oder to effect constant, periodical, aperiodical or statistical fluctuations of transmitted torque.

It is also possible to utilize the output signals for the purpose of effecting an adjustment of the adjustable device in order to transmit a torque which increases monotonously as a function of time up to a predetermined threshold value and thereupon remains at least close to such threshold value. The threshold value can be selected as a function of that variable parameter which indicates the condition of the vehicle. Such variable parameter can be one of a plurality of parameters including starting the vehicle at a forward or reverse speed of the variable-speed assembly and maintaining the vehicle in motion or at a standstill while the friction surfaces of the torque transmission system slip relative to each other.

It is also possible to utilize the output signals to effect an adjustment of the adjustable device so as to transmit a fluctuating torque having an amplitude which varies in accordance with a predetermined pattern up to a fixed or variable threshold value. The pattern can be determined by data stored in one or more memories of the control unit.

Still further, it is possible to utilize the output signals to effect an adjustment of the torque transmission system in order to transmit a torque which fluctuates in accordance with at least one of a plurality of different patterns including linearly, exponentially, stepwise, in sawtooth fashion, and in accordance with a trigonometric function (such as sine or cosine).

It is also possible to utilize the output signals in order to effect an adjustment of the adjustable device so as to cause the torque transmission system to transmit torque of a magnitude which varies within successive length-modulated time intervals. The adjustment of the aforementioned device in response to the output signals can be such that the amplitude of torque which is being transmitted within at least one of the intervals departs from the amplitude of torque being transmitted during at least one other interval.

It is equally possible to utilize the output signals in order to effect an adjustment of the adjustable device so as to cause the torque transmission system to transmit torque which varies within successive time intervals of varying duration or length.

Also, the output signals can be utilized to effect an adjustment of the adjustable device in order to cause the torque transmission system to transmit a torque which varies as a function of time without adversely affecting the acceleration and/or the motion or movements of the motor vehicle.

Still further, the output signals can be utilized for adjustment of the adjustable device in order to set the torque transmission system for the transmission of torque which varies as a function of time without adversely affecting the condition and/or the operability of the motor vehicle as well as to denote at least one of the following: (i) increased internal stressing of the torque transmission system, and (ii) increasing wear upon one or more constituents of the torque transmission system.

The control unit can further comprise means for predetermining a desired condition of the motor vehicle on the basis of at least one of a set or group or array of characteristic curves and one or more characteristic fields, and for comparing the actual condition of the vehicle with the predetermined desired condition in order to determine a critical condition of the vehicle on the basis of characteristic curves. The aforementioned means for initiating corrective and/or protective measures can include means for generating signals which denote undesirable or incorrect operation of the vehicle. At least one of the actual and desired conditions can be ascertained by the control unit on the basis of at least one of a plurality of signals including signals denoting the momentary or selected speed of the variable-speed assembly, the position of a first brake (e.g., a hand brake), the position of a second brake (e.g., a foot brake), the RPM of the prime mover, the position of a load lever (such as a gas pedal) of the vehicle, the gradient of the load lever, the position of the throttle valve in or for the prime mover of the motor vehicle (e.g., for an internal combustion engine in a passenger car), the time of fuel injection into one or more cylinders of the engine, the input RPM of the variable-speed assembly, the position of a tachometer (e.g., a tachometer generator which is designed to furnish signals denoting the RPM of the vehicle wheels), the position of the adjustable device, the torque being transmitted by the torque transmission system, and the torque which is transmissible by such system.

The signals which denote the magnitude of transmitted torque can include at least one of a plurality of signals indicating the RPM of the prime mover, the position of the load lever, the position of the aforementioned throttle valve and the fuel injection time. The control unit of such apparatus can be provided with means for carrying out at least one of operations including (i) processing the at least one of the above enumerated plurality of signals for the purpose of ascertaining the magnitude of transmitted torque, and (ii) ascertaining the magnitude of transmitted torque on the basis of data in at least one characteristic field stored in at least one memory of the control unit.

The ascertaining means of the control unit can include means for determining the magnitude of the torque being transmitted by the prime mover from signals which are supplied by an electronic circuit of the prime mover and/or by a data bus.

The ascertaining means can also include means for determining the extent of slip of parts in the torque transmission system reative to each other on the basis of signals which denote the RPM of the prime mover and the input RPM of the variable-speed assembly. The signal supplying components of such control unit can include sensor means serving to generate signals which denote the RPM of the prime mover. Furthermore, the signal supplying components of such control unit can include an electronic circuit for the prime mover and/or a data bus for the transmission of signals denoting the RPM of the prime mover. Still further, the signal supplying components of such control unit can include sensor means serving to generate signals which denote the input RPM of the variable-speed assembly. The determination of input RPM of the variable-speed assembly can also include the step or steps of processing signals which denote the RPM of the wheels of the motor vehicle and signals denoting at least one parameter of the variable-speed assembly (such as a manual transmission). The signal supplying components of such control unit can further include sensor means serving to generate the aforementioned signals which denote the RPM of the wheels of the motor vehicle. Alternatively, or in addition to the just mentioned sensor means, the signal supplying components can include a standard electronic antiblocking system (known as ABS) which serves to generate signals denoting the RPM of the wheels of the motor vehicle. The sensor means can include at least one sensor which serves to generate signals denoting the selected speed of the variable-speed assembly (such as the selected speed ratio of a manual transmission). Such at least one sensor can include a member which serves to monitor the position of at least one movable part of the variable-speed assembly.

The condition of the vehicle can be indicated by at least one of signals which are supplied by at least one sensor and/or by at least one electronic circuit. Such control unit can include a central computer which processes the at least one signal, i.e., the signal supplied by the at least one sensor and/or by at least one electronic circuit. The condition of the vehicle can be ascertained from at least one of a plurality of signals denoting the RPM of the prime mover, the input RPM of the variable-speed assembly, the RPM of the wheels of the motor vehicle, the position of the load lever, idling of the prime mover, an engaged condition of the torque transmission system, the torque of the prime mover, the magnitude of torque being transmissible by the torque transmission system, the selected speed of the variable-speed assembly, the intended selection of the speed of the variable-speed assembly, the fuel injection time, the stage of operation of the vehicle, and the position(s) of one or more brakes. The condition of the vehicle includes a starting condition which is or which can be detected and indicated on the basis of signals including a signal denoting an actual position of the aforementioned load lever, a signal denoting a selected speed of the variable-speed assembly, a signal denoting a difference between an RPM of the prime mover and an input RPM of the variable-speed assembly, and a signal denoting that the input RPM of the variable-speed assembly is less than the idling RPM of the prime mover.

If the variable-speed assembly constitutes a transmission or an equivalent assembly having a reverse speed, a first forward speed, a second forward speed and at least one additional forward speed, the control unit can include means for generating first output signals which denote the selection of one of the reverse, first forward and second forward speeds and second output signals which denote the selection of the at least one additional forward speed in the starting condition of the vehicle.

The condition of the vehicle includes starting and other than starting conditions, and the extent of slip can be determined by the control unit on the basis of monitoring the differences between the RPM of the prime mover and the input RPM of the variable-speed assembly. Such control unit can further comprise means for indicating the condition of the vehicle as other than its starting condition in response to a reduction of the monitored difference between the RPM of the prime mover and the input RPM of the variable-speed assembly below a predetermined threshold value. It is presently preferred to select a predetermined threshold value which is less than 70 RPM, e.g., in the range of about 50 RPM and most preferably in the range of about 20 RPM.

If the torque transmission system includes a friction clutch having a rotary flywheel which is driven by the prime mover, a rotary pressure plate which is also driven by the engine and is adjustable axially toward and away from the flywheel, and a rotary clutch disc between the flywheel and the pressure plate to transmit torque to the variable-speed assembly when the clutch is at least partially engaged, the input of the friction energy takes place at the friction surfaces of the clutch disc, which are adjacent friction surfaces on the flywheel and on the pressure plate, as soon as the flywheel and the pressure plate are caused to rotate. The friction energy can be divided into a plurality of branches including a first branch which causes a heating of the flywheel and at least one second branch which entails a heating of the pressure plate. The means for ascertaining is or can be operative to determine the temperature of the pressure plate. The pressure plate can include a single mass or a plurality of masses in heat exchanging relationship with each other. The at least one threshold value can be constant or can vary as a function of temperature changes. If the pressure plate comprises a plurality of masses, it preferably further comprises fixed or temperature-dependent heat transmitting connecting means between the masses.

It is also possible to employ a control unit having ascertaining means including means for calculating a temperature reducing cooling effect with resort to a heat conductor and a convection process. The convection process can be a function of the RPM of the torque transmission system, and the cooling effect on the basis of convection can include a portion which is proportional to the RPM of the torque transmission system.

The novel features which are considered as characteristic of the invention are set forth with requisite particularity in the appended claims. The improved regulating apparatus itself, however, both as to its construction and the mode of assembling and utilizing the same, together with numerous additional novel features and numerous additional advantages thereof, will be best understood upon perusal of the following detailed description of certain presently preferred specific embodiments with reference to the accompanying Figures of the drawings.

BRIEF DESCRIPTION OF THE DRAWINGS

FIG. 6 is a schematic representation of the flow of heat into and from a component part of a torque transmission system the operation of which can be regulated in accordance with the invention;

FIG. 7 is a similar schematic representation of the flow of heat into and from a multiple-mass component of the torque transmission system;

DESCRIPTION OF PREFERRED EMBODIMENTS

Figure 1:
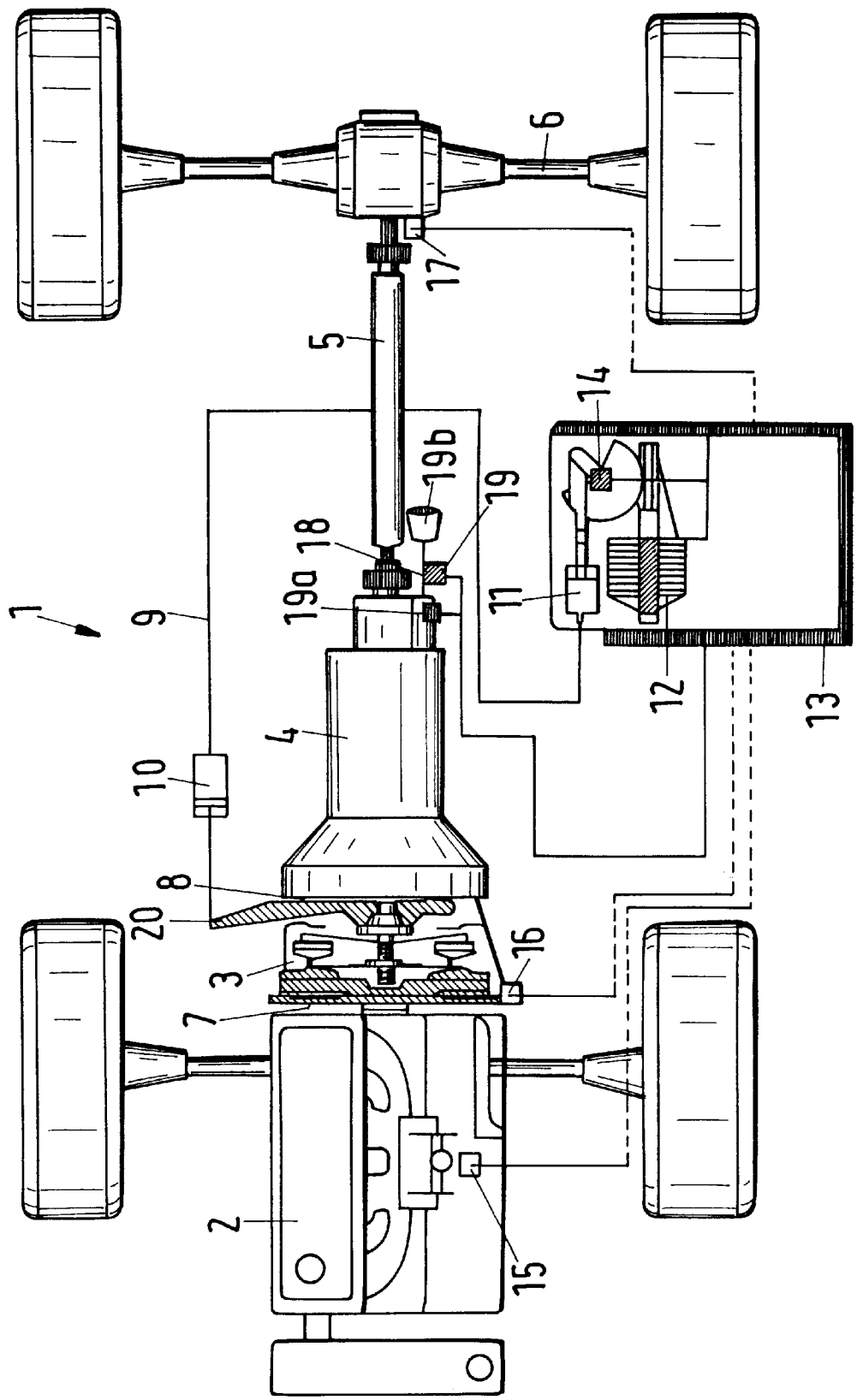
FIG. 1 is a schematic plan view of a motor veicle wherein the power train between the prime mover and the wheels includes a torque transmission system in the form of a friction clutch the operation of which is regulated by an apparatus embodying one form of the present invention, certain portions of the torque transmission system and of the control unit being broken away.

FIG. 1 shows schematically a motor vehicle 1 with a prime mover 2, e.g., a motor or a combustion engine. The power train between the prime mover 2 (hereinafter called engine) and the front and/or rear wheels of the vehicle 1 comprises a torque transmission system 3 and a variable speed assembly 4 in the form of a transmission. The torque transmission system 3 (hereinafter called clutch for short) of the illustrated vehicle 1 is installed in the power train between the engine 2 and the transmission 4, and a shaft 5 (which receives torque from the transmission 4) serves to transmit torque to the axle 6 for the front or rear wheels of the vehicle.

The clutch 3 can constitute or include a friction clutch, a magnetic powder clutch or a so-called bypass clutch or lockup clutch which is used in or in conjunction with hydrokinetic torque converters. For example, the clutch 3 can constitute a so-called self-adjusting clutch (SAC) of the type disclosed, e.g., in commonly owned U.S. Pat. No. 5,409,091 granted Apr. 25, 1995 to Wolfgang Reik et al. for "Automatically adjustable friction clutch".

The transmission 4 can constitute a manual transmission with at least three forward speeds and a reverse speed. However, it is equally possible to employ an automatic transmission or an automated manual transmission. If the transmission 4 is an automatic transmission, it can be designed to transmit torque by way of a clutch, such as a friction clutch. Such manual, automated manual or automatic transmission can receive torque from a torque transmission system 3 which, as already mentioned above, can constitute a friction clutch or a lockup or bypass clutch for use in or in conjunction with a hydrokinetic torque converter or a magnetic powder clutch but which can also constitute a starter or start-up clutch and/or a reversing transmission clutch and/or a safety clutch for transmission of manually or automatically selected torque.

The input element 7 of the illustrated clutch 3 can constitute a flywheel which receives torque from a rotary output element of the engine 2, and the output element 8 of the clutch 3 can constitute an input shaft which transmits torque to the transmission 4 and receives torque from the hub of a clutch disc or clutch plate 3b disposed between the flywheel 7 and an axially movable pressure plate 3a of the clutch 3. The clutch disc 3b carries customary friction linings having exposed surfaces in frictional (sliding or non-sliding) engagement with the friction surfaces of the flywheel 7 and pressure plate 3a when the clutch is at least partially engaged to transmit torque of selected magnitude between the engine 2 and the transmission 4. The clutch 3 further comprises a customary clutch spring 3c (e.g., a dipahragm spring) which serves to bias the pressure plate 3a against the adjacent friction linings of the clutch plate 3b when the clutch is at least partially engaged.

When the clutch 3 is partially engaged so that the friction surfaces of the linings on the clutch disc 3b can slide or slip relative to the adjacent friction surfaces of the flywheel 7 and pressure plate 3a, i.e., when the RPM of the flywheel 7 corresponding to the engine RPM which is monitored by the sensor 16) departs from the RPM of the clutch disc 3b and shaft 8 (monitored by an RPM sensor 16a), the clutch 3 receives an energy input the magnitude of which depends upon the actually transmitted or transmittable torque and the difference between the two RPM and which constitutes friction heat. Under such circumstances of operation of the clutch 3, the kinetic rotational energy is converted into friction work or frictional energy. This, in turn, entails a heating of at least some portions of the clutch 3 (note the temperature sensor 16b), particularly in the region of the friction surfaces. In the absence of any undertakings to the contrary, the heating can result in damage to or in complete destruction of one or more parts of the clutch 3, such as the friction linings on the clutch disc 3b. In fact, uncontrolled overheating can result in the destruction or inoperativeness of the entire friction clutch 3.

Friction heat which develops in the region of friction surfaces of the linings forming part of the clutch disc 3b is led away through various component parts of the clutch 3. In the illustrated clutch, wherein the clutch disc 3b is disposed axially between the flywheel 7 and the pressure plate 3a, the developing friction heat is led away from the friction linings along two paths, namely by way of the flywheel 7 and by way of the pressure plate 3a. At the instant of the actual development of friction heat (as a result of slip between the friction surfaces of linings on the clutch disc 3b and the friction surfaces on the adjacent parts 7 and 3a), that percentage of heat which is led away from the friction linings by convection is rather small because no air, or no appreciable quantities of air, can penetrate between the two pairs of abutting friction surfaces.

A substantial percentage of the developing friction heat is led away by way of the pressure plate 3a and, in the first approximation, the remainder of such friction heat is led away through the flywheel 7. For example, the amount of friction heat which is evacuated via pressure plate 3a can constitute between about 25% and 75% (e.g., 50%) of the overall friction heat. One mode of ascertaining or calculating the amount of the developing or developed friction heat energy involves integration of the difference between the RPM of the flywheel 7 (sensor 16) and the clutch disc 3b (sensor 16a) and multiplication with the transmitted clutch torque as a function of time. Another possibility involves the determination of decreasing friction energy on the basis of measurement values and characteristic curves or characteristic fields.

An adjustable device (including the parts numbered 9 to 12) is operable or adjustable by a control unit 13 to select the torque which is transmittable by the clutch 3, and such device can be said to form part of the control unit 13. This adjustable device (also called actor) includes an electric motor 12 which is directly controlled by the electrical and/or electronic regulating and output components of the control unit 13. The electric motor 12 and, if desired, one or more other constituents of the torque selecting device can be integrated into or otherwise assembled with the control unit 13 in order to achieve savings in space and/or to simplify the transmission of signals between the unit 13 and the motor 12.

The adjustable device (hereinafter called actor for short) further includes a transmission (such as a worm gearing or a spur gearing) which transmits motion between the motor 12 and a pusher or piston rod forming part of a master cylinder 11. The latter is connected with a slave cylinder 10 by a conduit 9, e.g., a conduit for a suitable hydraulic fluid, and the slave cylinder 10 controls the movements of an actuator 20 (e.g., a fork or a centrally located disengaging member) which controls the application of force to the pressure plate 3a and can effect movements of the pressure plate between two end positions. The pressure plate 3a assumes one of these end positions when the clutch 3 is fully engaged and the other of such end positions when the clutch is fully disengaged. Each intermediate position of the pressure plate 3a can be indicative of a different torque and the axial position of the pressure plate 3a can be changed in a direction to increase or to reduce the magnitude of the transmitted torque. Furthermore, it is possible and often desirable to select the magnitude of the torque being actually transmitted by the clutch 3 to exceed by a predetermined value the magnitude of the momentarily prevailing engine torque. This ensures proper transmission of normally applied engine torques while simultaneously ensuring adequate damping or insulation of irregularities of RPM such as, for example, torque peaks which should not be transmitted to transmission 4, i.e., to the power train portion downstream of the clutch 3.

The movements of the piston rod or pusher of the master cylinder 11 under the action of the transmission between such master cylinder and the electric motor 12 are monitored by a suitable sensor 14 which transmits signals to the corresponding input of the control unit 13; such signals indicate the setting of the clutch 3, i.e., the magnitude of torque which is being transmitted between the engine 2 and the transmission 4.

The illustrated slave cylinder 10 has an axially movable piston rod which transmits motion directly to the actuator 20 for the pressure plate 3a of the clutch 3. As mentioned above, the conduit 9 is assumed to contain a supply of a suitable hydraulic fluid; however, it is equally possible to employ a pneumatically operated actor and it is also possible to establish a different (non-electrical or non-electronic) connection between the output or outputs of the control unit 13 and the controls for the electric motor 12.

The inputs of the control unit 13 receive corresponding signals from several additional sensors denoting at least some additional variable parameters which are relevant in connection with proper adjustment of the clutch 3. Such sensors can be in operation at all times or during certain stages of operation of the motor vehicle 1 and/or the engine 2 and/or the clutch 3 and/or the transmission 4. Moreover, one or more sensors can also transmit signals to one or more additional electronic and/or other control units of the motor vehicle 1.

FIG. 1 shows that, in addition to the aforediscussed sensors 14, 16a and 16b, the motor vehicle 1 includes a sensor 15 which monitors the position of the throttle valve under the hood of the vehicle, the aforementioned engine RPM sensor 16 which can monitor, for example, the RPM of the flywheel 7 or of the part which drives the flywheel 7, and a sensor 17 in the form of a tachometer generator which monitors the RPM of the axle 6, i.e., the speed of the motor vehicle 1. FIG. 1 further shows that the vehicle 1 also comprises a lever 18 for manual selection of the speed of the transmission 4, as well as a sensor 19, 19a which is designed to transmit to the control unit 13 signals denoting the intended or contemplated selection of the transmission speed and/or the already completed selection of such speed. The part 19a of this last mentioned sensor can be directly coupled to the transmission 4 and can be designed to transmit to the corresponding input of the control unit 13 signals denoting the already selected (i.e., the actually effective) speed of the transmission.

There is also included a sensor 19c which is coupled to the fuel injection system and provides information to control unit 13 regarding fuel injection time.

The control unit 13 is at least temporarily connected with one or more of the aforediscussed sensors and processes the thus received input signals into one or more output signals which its output or outputs transmit to the controls for the electric motor 12 of the actor for the clutch 3. In one of its presently preferred forms, the control unit 13 includes or forms part of or constitutes a computer which embodies a processing system in the form of hard- and/or software.

The processing system of the control unit 13 can include a component which can be said to constitute a transmission ratio detector, a component which can be said to constitute a means for ascertaining the magnitude of transmitted torque, a component which can be said to constitute a means for determining the extent of slip of the surfaces of friction linings on the clutch disc 3b relative to the adjacent friction surfaces of the flywheel 7 and pressure plate 3a and/or vice versa, as well as a component which can be said to constitute a means for determining the condition of the motor vehicle. The component which detects the transmission ratio is connected with and receives signals from the sensor 19, 19a to determine at least the selected (i.e., actually effective) speed of the transmission 4. To this end, the parts 19, 19a of such sensor are suitably connected to and/or otherwise associated with a shifting lever 19b and/or with other transmission parts in the transmission case such as, for example, a central shifting shaft or several shifting rods in order to monitor the position(s) and/or the speed of such transmission parts. The sensor 19, 19a transmits to the control unit 13 appropriate signals which are processed by the corresponding component of the processing system (if necessary jointly with stored signals denoting various threshold values) to generate signals denoting the actual setting or speed of the transmission 4.

The component which ascertains the magnitude of transmitted torque can be used to calculate the actually transmitted engine torque. To this end, such component can process (for example) signals denoting the engine RPM (note the aforementioned sensor 16), the position of the gas pedal and/or the position of the throttle valve (note the sensor 15), the duration of intervals of fuel injection and/or others (such as means, shown at 501, for detecting pressure in the intake manifold of the engine 2). At least one of these signals can be utilized to ascertain the actual engine torque on the basis of characteristic fields or characteristic curves. However, it is equally possible to ascertain the engine torque from the engine electronics 500 by way of a data bus 502.

The component which determines the extent of slip, i.e., the difference between the engine RPM and the RPM at the input of the transmission 4, can be designed to calculate and/or otherwise ascertain the slip in dependency upon the characteristics of one or more signals. The engine RPM ($k_m$) can be ascertained directly by way of the sensor 16, and the same applies for the input RPM ($n_g$) of the transmission 4 (sensor 16a). Alternatively, the input RPM of the transmission 4 can be calculated on the basis of signals from the tachometer generator 17 and sensors 503, 504, 505, 506 (RPM of the wheels 6 driven by the axle 6 and of the wheels driven by the other axle) and/or on the basis of signals denoting the actual speed of the transmission 4. The sensors 503 to 506 transmit signals to an antiblock system (ABS) 507 which is connected to the control unit 13.

The component which determines the condition of the motor vehicle can process signals from all of the aforementioned sensors, with or without additional information pertaining to the motor vehicle 1, its engine 2 and/or its transmission 4. The thus obtained information can be processed into one or more signals indicating, for example, whether or not the vehicle is in the process of being started, is at a standstill, is in motion and/or is being maintained at a standstill by a parking lock or the like. To this end, the signals can be compared with and/or otherwise evaluated by resorting to reference values such as characteristic fields and/or characteristic curves. For example, the condition determining component can indicate that the vehicle 1 is being started when the fuel metering lever or pedal has been actuated, when the signals by the sensor or sensors monitoring the transmission 4 indicate that the setting of the transmission is other than that for neutral and the transmission input RPM $n_g$ is less than the idling RPM. On the other hand, the vehicle 1 is or can be considered to be in motion (in actual use) for example when, following starting of the vehicle, the slip of the clutch 3 is less than a predetermined threshold value.

Once the control unit 13 has determined the desired or appropriate torque which is to be transmitted by the clutch 3 (as already explained hereinbefore, such determination can be made on the basis of one or more signals transmitted to the corresponding input or inputs of the unit 13), the output or outputs of the unit 13 transmit one or more appropriate signals to the electric motor 12 which causes the part 20 to effect an appropriate adjustment of the clutch by way of the cylinders 10, 11 of the actor.

The illustrated fluid-operated actor including the cylinders 10, 11 and the conduit 9 can be replaced with a purely mechanical motion transmitting connection between the electric motor 12 (or an equivalent thereof) and the part 20 which is used to directly adjust the clutch 3. For example, the mechanical connection can comprise a suitable linkage which can be caused to completely engage or completely disengage the clutch as well as to select any one of a plurality of conditions or adjustments between the fully engaged and fully disengaged conditions. Such mechanical connection can act upon a part 20 in the form of a fork which can effect appropriate adjustments of the condition of the clutch 3 by way of a standard bearing, either in a direction toward more pronounced engagement or toward less pronounced engagement of the clutch.

As already mentioned above, the illustrated manual transmission 4 can be replaced with an automatic transmission and the clutch 3 is then replaced with a suitable starter clutch for such automatic transmission. For example, an automatic transmission to replace the manual transmission 4 of FIG. 4 can be of the type disclosed in commonly owned U.S. Pat. No. 5,169,365 granted Dec. 8, 1992 to Oswald Friedmann for "Power train".

Still further, it is possible to utilize the aforementioned actor 9–12 and the control unit 13 to select the condition of a clutch which is installed upstream and/or downstream of the transmission and which can constitute a so-called starter clutch, a so-called reversing transmission clutch and/or a so-called safety clutch or torque limiting clutch.

One of the purposes of the improved method and apparatus is to regulate the operation of the clutch 3 or another torque transmission system. Another object of such method and apparatus is to recognize and/or predict a critical condition of the torque transmission system on the basis of certain measured values and/or system input values whenever the system assumes a certain condition which is characterized by a particular behavior during a next-following interval of time. For example, a critical condition can arise as a result of the development of a certain amount of wear and/or an increased energy input into portions of the torque transmission system and/or as a result of a rise of temperature and/or as a result of more pronounced or excessive slip of the confronting and abutting friction surfaces relative to each other.

By way of example, the aforementioned and/or other critical situations can develop or arise due to a failure of the torque transmission system and/or due to the failure or inability of a driver to properly operate the vehicle having a power train wherein a torque transmission system is operated in accordance with the method and by the apparatus of the present invention. One of the causes of the development of a critical situation is that the operator of the vehicle attempts to start the vehicle while the transmission 4 is set to operate at a speed which is higher than appropriate for satisfactory starting. For example, the driver might have selected a speed other than the reverse speed and higher than the first or second forward speed, namely an additional (such as third or fourth) forward speed. Another critical situation can arise when the operator attempts to maintain the motor vehicle at a standstill or to advance it at a very low speed on an upwardly or downwardly sloping road surface and without the actuation of a hand brake and/or foot brake; at such time, the clutch 3 or another torque transmission system is caused to slip while it is being called upon to transmit a very pronounced torque in order to maintain the vehicle on the road surface.

If the vehicle 1 is started while the transmission 4 is set to operate at a high speed (e.g., a speed other than the reverse speed or the first or second forward speed), the torque transmission system 3 operates with slip for an extended interval of time which often entails the application to the torque transmission system of an excessive energy input in the form of friction energy. This causes a rise of temperature which can cause serious or irreparable damage to the torque transmission system.

If the torque transmission system is a friction clutch of the type or similar or analogous to that shown in FIG. 1, excessive slip between the friction linings of the clutch disc 3*b* on the one hand and the friction surfaces of the flywheel 7 and pressure plate 3*a* on the other hand results in the application of large quantities of energy to the friction linings with attendant generation of pronounced quantities of friction heat. The improved method and apparatus are capable of ascertaining or calculating or predicting (with assistance from signals furnished by the aforediscussed sensors) an excessive slip between certain parts of the torque transmission system by measuring and/or calculating and/or predicting the application of excessive energy to one or more parts, and of initiating and/or actually carrying out one or more undertakings which are necessary to avoid excessive stressing and/or complete destruction of (i.e., excessive or irreparable damage to) the torque transmission system.

Since it is already known to construct a friction clutch or an analogous torque transmission system in such a way that the magnitude of transmitted torque can be selected within a certain range in order to ensure adequate insulation and/or damping of fluctuations of transmitted torque and/or torsional vibrations, power trains employing such torque transmission systems must be equipped with means for establishing a barrier and/or a threshold value which is to ensure that the slip between one or more pairs of contacting friction surfaces cannot exceed a maximum permissible value. Any slip or a slip below such maximum permissible value is considered acceptable or uncritical because, on the one hand, such slip does not cause a temperature rise which could adversely affect the torque transmission system and/or the entire power train and, on the other hand, such slip entails a desirable and advantageous damping of torsional vibrations. The control units for such torque transmission systems are designed to prevent the development of a slip which exceeds the aforementioned maximum permissible value and/or to warn the person or persons in charge (e.g., the operator of a motor vehicle) that the already existing circumstances or the circumstances or conditions about to develop are conducive to the development of damage to and/or of the destruction of the torque transmission system and/or the entire power train. Otherwise stated, the control units warn the person or persons in charge that it is necessary to reduce the extent of slip or to prevent any slip (or any additional slip) if the power train and/or one or more of its constituents are to remain intact.

The improved method and apparatus ensure that, when the slip RPM between the flywheel 7 and the clutch disc 3*b* of the friction clutch 3 shown in FIG. 1 rises to a predetermined maximum permissible value which can be a constant value or can vary in dependency on the variations of one or more parameters which are being monitored by sensor means serving to transmit appropriate signals to the corresponding inputs of the control unit 13, the torque which can be transmitted by the clutch 3 is regulated or varied or selected as a function of time so that the thus achieved variations of transmissible torque can be considered by the operator of the vehicle 1 as a signal or as a series of signals that the energy input into the clutch 3 is excessive and that the then existing condition of use of the clutch must be changed, either immediately or within the immediately following interval of time (e.g., an interval of predetermined duration).

The transmission of a clutch torque which varies as a function of time is preferably carried out in such a way that the motor vehicle 1 remains operative (ready for use or ready for continued use) even when the magnitude or the extent of slip reaches the one or the other threshold value. In other words, and contrary to prior proposals, the reaching of an upper or a lower threshold value does not automatically entail a complete engagement or a complete disengagement of the friction clutch 3.

In accordance with the just outlined feature of the invention, the magnitude of torque which can be transmitted by the clutch 3 can be varied at periodic or aperiodic time intervals, e.g., the transmissible torque can be varied at selected intervals T and can involve a single change or a series of successive changes of amplitude of the transmitted or transmissible torque as a function of time.

The intentionally induced changes of the magnitude of transmitted torque (whenever necessary to counteract a situation which could entail damage to or total destruction of the clutch and/or of the entire power train) can be selected in such a way that they affect the comfort of the occupant or occupants of the vehicle embodying a torque transmission system and the novel regulating apparatus therefor. The discomfort or the feeling of discomfort is or can be so pronounced that the operator of the vehicle is reliably informed in good time that the condition of the torque tansmission system has reached a critical stage or that such critical stage is about to be reached. Otherwise stated, it is within the purview of the invention to select the operation of the regulating apparatus in such a way that, when necessary or desirable, the apparatus initiates a dynamic behavior of the vehicle which is selected with a view to establish circumstances which are plainly uncomfortable to the operator or, at the very least, are sufficiently different from normally prevailing circumstances to reliably inform the operator that the transmission of torque is unsatisfactory or is about to become unsatisfactory unless adequate measures to the contrary are undertaken, either immediately or within a certain immediately following interval of time. As already mentioned above, one of the circumstances which can induce the novel regulating apparatus to cause at least some discomfort to the operator of the vehicle can include the development of excessive slip between the relatively movable component parts of a friction clutch, namely a slip which could entail serious damage to or complete destruction of the clutch and/or of the entire power train embodying the clutch. Nevertheless, the vehicle remains or can remain operative regardless of whether the excessive slip is avoided automatically (e.g., due to the development of circumstances which are uncomfortable to the operator of the vehicle) or whether such slip must be reduced or eliminated within a reasonable time following the development of conditions which are not comfortable to the operator of the vehicle. The just described mode of operation of the improved regulating apparatus has been found to be desirable on the ground that it reduces the danger of accidents which could develop if the vehicle were permitted to become totally unfit for further operation.

Figure 2:
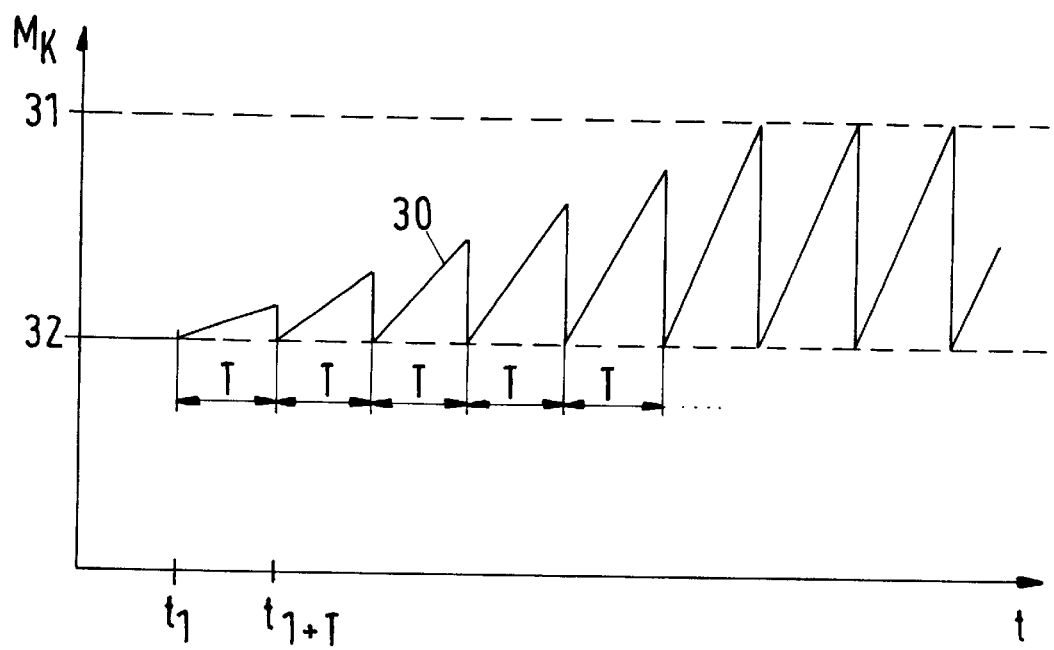
FIG. 2 is a diagram wherein the curve denotes one form of torque being transmittable by resorting to the method and to the apparatus of the present invention.

FIG. 2 shows a diagram wherein the transmissible clutch torque $M_K$ is measured along the ordinate and the time $t$ is measured along the abscissa. The transmissible torque is indicated by the curve 30. Such transmissible torque is constant and matches a predetermined minimum or lower threshold value 32 during an initial interval of time ending at $t_1$. If the circumstances warrant it, the amplitude of transmissible torque thereupon varies for successive predetermined intervals of time (T), and the amplitude of the curve 30 can increase from the initial interval T (between the instants $t_1$ and $t_1+T$) during each next-following interval. This causes the operator of the vehicle to feel at least some discomfort constituting a warning that the transmission of torque by the torque transmission system (such as the clutch 3 of FIG. 1) is unsatisfactory or is about to become unsatisfactory. One of the reasons for unsatisfactory operation of the clutch is or can be that the operator has started the vehicle 1 by shifting the transmission 4 into an unsatisfactory speed ratio, e.g., for operation at a third or fourth forward speed in lieu of operation at a first or second forward speed or at a reverse speed.

At least some of the discomfort which is felt or which is to be sensed by the operator of the vehicle 1 is attributable to the selected abrupt drop of transmissible torque (curve 30) at the instant $t_1+T$, i.e., after elapse of an interval T following the initial interval of transmission of at least substantially constant torque (note the lower threshold value 32) during the interval between the zero point and the point $t_1$ of the abscissa in the diagram of FIG. 2. The magnitude of transmitted or transmissible torque increases again during the interval T following the instant $t_1+T$ and such amplitude rises to a value exceeding that at the instant $t_1+T$, and the same situation arises again and again during the next-following intervals T. The drop of transmissible torque after the elapse of each of a series of successive intervals may but need not be as abrupt as actually shown in FIG. 2. This will be readily appreciated by observing the corresponding curve in the diagram of FIG. 3.

The feature that the magnitude of transmissible torque (curve 30) does not drop below the lower threshold value 32 during the aforediscussed stage of operation of the apparatus for regulating the transmission of torque by the clutch or an analogous torque transmission system 3 is desirable and advantageous because this ensures that the clutch can invariably transmit a certain amount of torque, namely the amount which is indicated by that (horizontal) portion of the curve 30 which extends between the zero point and the instant $t_1$ on the abscissa of the diagram shown in FIG. 2. The line 31 denotes the upper threshold value for the torque adapted to be transmitted by the clutch 3. The feature that the amplitude of transmitted or transmissible torque increases from interval T to interval T is often desirable because this is even more likely to warn the operator that the operation of the clutch 3 is unsatisfactory (or not entirely satisfactory) or is about to become unsatisfactory during the next-following (particularly immediately following) interval of time.

The curve 30 in the diagram of FIG. 2 further indicates that the increase of transmissible torque during each of a series of successive intervals T is at least substantially constant. This is but one of numerous possible modes of selecting the magnitude of transmissible torque, i.e., the angle of slope of each or any section of the curve 30 during any or each interval T need not be constant as actually shown in FIG. 2. It is merely desirable to ensure that the changes of the magnitude of transmissible torque during at least some of the series of intervals T vary (linearly and/or otherwise) as a function of time.

By way of example, the magnitude of transmissible torque can vary in a manner such that the curve 30 is indicative of a trigonometric function and/or a step function and/or a square (rectangular) function and/or a sawtooth function and/or an additive or multiplicative combination of such functions. Moreover, the duration of the intervals T and/or the amplitude of the respective portions of the curve 30 can vary stochastically (i.e., accidentally or at random). For example, a statistic or accidental (i.e., in accordance with a stochastic or random process) regulation of the configuration of the curve 30 can be realized by selecting for the time intervals T and/or for the amplitude of the curve 30 an upper and a lower threshold value and the regulating apparatus is designed to simply select at random any accidentally found value which is in the range between the two threshold values. Such accidentally selected or picked values are resorted to for the transmission of torques during those stages of operation of the clutch 3 when the operator is to be informed (particularly as a result of the development of circumstances which are uncomfortable to the operator) that the operation of the torque transmission system is or is about to become unsatisfactory.

The upper threshold (or maximum permissible) value of the magnitude of transmissible torque (as denoted by the line 31 in the diagram of FIG. 2) can be selected in dependency upon the operating point of the motor vehicle 1 in such a way that, if the respective maximum permissible transmission of torque is exceeded, the engine 2 of the motor vehicle is subjected to an excessive load and the increased value of the transmissible torque entails an excessive reduction of the engine RPM such as could result in actual choking of the engine. If selected, the aforediscussed stochastic regulation of the transmissible torque (i.e., of the shape of the curve 30 in the diagram of FIG. 2) can also take place in accordance with the aforementioned functions and by resorting to a periodic or aperiodical procedure.

Figure 3:
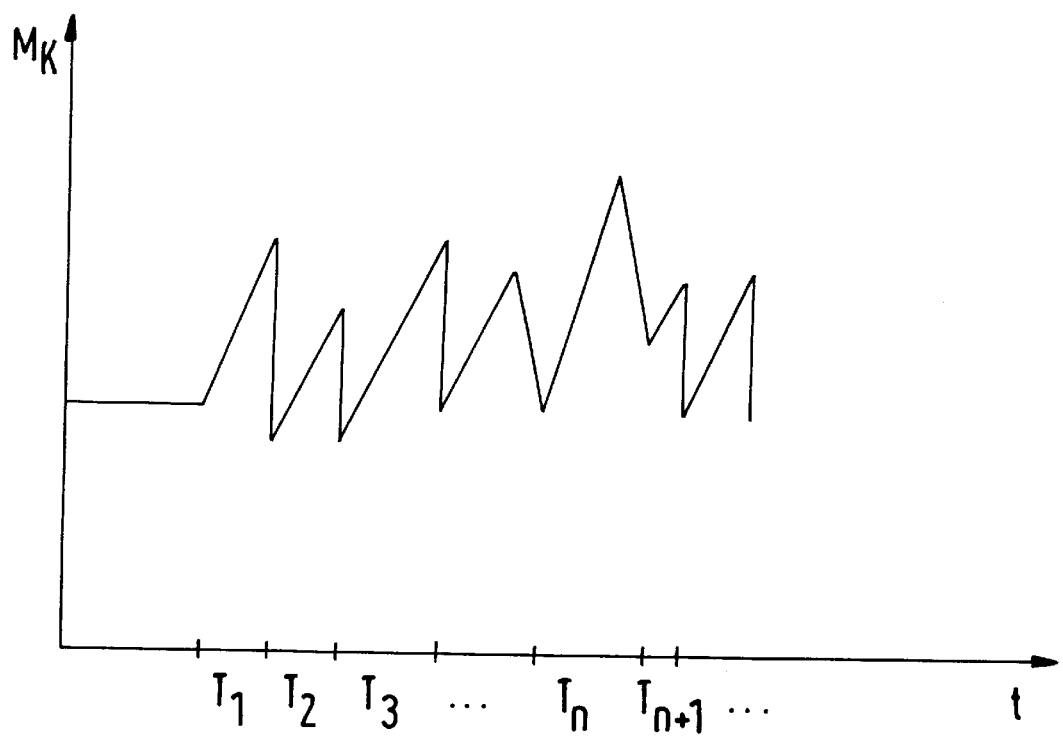
FIG. 3 is a diagram wherein the curve denotes another form of torque which can be transmitted in accordance with the teaching of the present invention.

The curve in the diagram of FIG. 3 indicates aperiodic variations of the magnitude of transmissible torque. As shown, the amplitude of torque can vary from interval to interval (note the intervals $T_1$ and $T_2$), it can decrease abruptly after elapse of an interval (note the interval $T_3$), it can increase gradually to thereupon decrease gradually at the same rate or at a different rate (note the interval $T_N$), it can increase from an initial value to a higher value to thereupon decrease to a value less than the initial value (note the interval $T_{N+1}$), and so forth.

Figure 4:
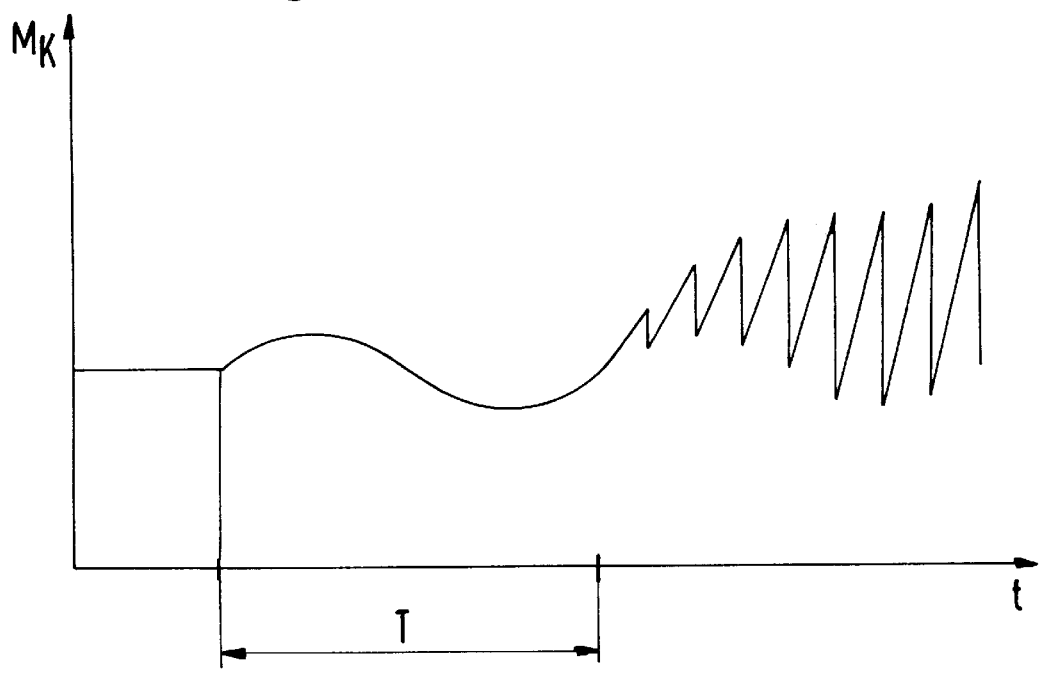
FIG. 4 is a third diagram wherein the curve denotes still another form of torque which can be transmitted by following the method and by resorting to the apparatus of the present invention.

FIG. 4 shows a curve denoting a presently preferred mode of transmitting torque by a torque transmission system, such as a friction clutch 3 in the power train of a motor vehicle, when the vehicle is brought to a halt on an inclined (sloping) road surface without the application of a hand brake and/or a foot brake. Under such circumstances, it is considered to be advisable to select the transmission of signals between the output or outputs of the control unit 13 and the electric motor 12 of the actor shown in FIG. 1 in such a way that one starts with a low-frequency variation of transmissible torque at an amplitude which is low atleast at the onset. This is denoted by that portion of the curve shown in the diagram of FIG. 4 which indicates the transmissible torque during the interval T. Such selection of transmissible torque can result in a slight creeping movement toward a higher level of an upwardly sloping road surface and/or a slight rolling downward movement along an inclined road surface and/or to periodical creeping and rolling. The amplitude of the corresponding portion of the curve in the diagram of FIG. 4 is low or relatively low, i.e., the amplitude of the rolling or creeping movement should not endanger the safety of the occupant or occupants of a motor vehicle and/or of the occupant or occupants of other vehicles on the same road and/or cause any other traffic problems and/or problems involving the lives and/or safety of person or persons occupying and/or bypassing the motor vehicle embodying the improved torque regulating apparatus.

If a regulation of transmissible torque as indicated by the portion of curve within the interval T in the diagram of FIG. 4 does not induce the operator of the vehicle to carry out one or more remedial steps (such as applying a hand brake or a foot brake which would or could automatically result in an undertaking to prevent any or any further overstressing of the torque transmission system because the application of one or more brakes would prevent the system from continuing with the transmission of unsatisfactory torque), the operation of the regulating apparatus can be selected in a manner as indicated by the right-hand portion of the curve in the diagram of FIG. 4. Thus, the amplitude of transmitted torque can be caused to vary at intervals much shorter than the interval shown at T. This ensures that the torque transmission system is shielded or protected against excessive damage and/or further damage, e.g., by preventing the development of excessive wear. The right-hand portion of the curve in the diagram of FIG. 4 resembles the curve 30 in the diagram of FIG. 2 except that a (horizontal) line denoting the lower threshold value (refer to the line 32 in the diagram of FIG. 2) is not a straight line. The pronounced variations of transmissible torque as denoted by the right-hand portion of the curve in the diagram of FIG. 4 are even more likely to draw the attention of the operator of a motor vehicle to the fact that the transmission of torque by the friction clutch or an analogous torque transmission system must be altered (e.g., by the application of a hand brake and/or a foot brake) because the operation of the torque transmission system has reached or is about to reach a critical stage, i.e., the condition of the motor vehicle or the mode of operating the motor vehicle should be altered by the operator of such vehicle.

Figure 5:
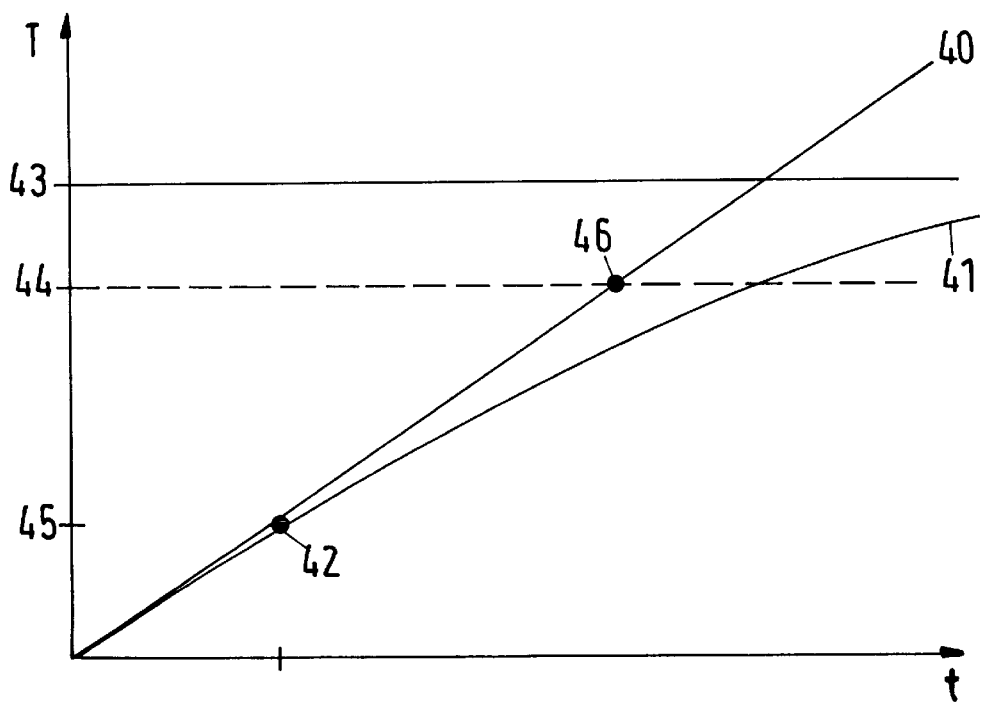
FIG. 5 is a diagram wherein the curves denote various temperatures of the torque transmission system the operation of which is to be regulated in accordance with the present invention.

The diagram of FIG. 5 shows the progress of two temperature curves 40 and 41 as a function of time. The temperature Te is measured along the ordinate and the time $t$ is measured along the abscissa. The horizontal line 43 denotes a maximum permissible temperature of a portion of or the entire torque transmission system (such as the friction clutch 3 of FIG. 1), and the curve 40 intersects the line 43 at a point 47. In other words, when the temperature Te denoted by the curve 40 rises to a point above 47, the torque transmission system which is acted upon by such temperature is likely to undergo or is already undergoing at least partial destruction as a result of overheating. Thus, it is important to ensure that the temperature Te of the torque transmission system should not exceed the value denoted by the line 43 in the diagram of FIG. 5 even if the operation of such system is improper. The improved method and apparatus are designed to regulate the operation of the torque transmission system in a manner to prevent the just discussed overheating.

By way of example, and assuming that the temperature Te denoted by the curve 40 has reached the point 46 on a broken line 44 denoting a temperature at least slightly below that denoted by the solid line 43. Detection of such temperature (point 46) by a suitable sensor located at the clutch 3 of FIG. 1 results in the generation of a signal which induces the control unit 13 to effect a regulation which is modulated as a function of time to warn the operator (e.g., by rendering the ride uncomfortable) so that the operator is apprised on the need for the carrying out of one or more undertakings which reliably prevent a rise of the temperature of the torque transmission system above a value denoted by the point 46 in the diagram of FIG. 5.

Overheating of one or more parts of or of the entire torque transmission system can take place when the operator has selected an improper (e.g., the third or fourth forward) speed of the transmission 4 in order to start the vehicle. Furthermore, an overheating of the torque transmission system can also take place when the vehicle is brought to a stop (while the engine is running) while the vehicle wheels contact an upwardly or downwardly sloping road surface and the driver has failed to apply at least one brake. In either event, the torque transmission system is likely to undergo extensive wear. However, it is also possible that excessive wear develops for reasons other than improper selection of the speed of the transmission 4 and/or failure to apply one or more brakes. For example, critical conditions (denoted by the point 42 on the curve 40 in the diagram of FIG. 5) can develop at a temperature Te (indicated at 45) which is well below that indicated by the line 43 and even well below that denoted by the line 44. Such critical conditions can arise irrespective of whether the temperature of the torque transmission system is likely to rise in a manner as indicated by the curve 40 or in a manner as indicated by the curve 41 (in each instance as a function of time $t$). An important (and often critical) factor is the duration of the interval of extensive (higher than normal) wear. The control unit 13 receives a signal when the extent of such wear reaches a critical value irrespective of whether or not the temperature Te has reached the level 44 or 43, i.e., a level well above the level of the temperature shown at 45 at which the control unit 13 receives a signal denoting a critical condition of the torque transmission system.

FIG. 6 is a diagram showing the manner in which the distribution of heat in a model can be resorted to in order to calculate the temperature of a clutch or another torque transmission system. The arrow 100 denotes the total developing heat at the side of the pressure plate (such as the pressure plate 3a in the clutch 3 of FIG. 1). In other words, that quantity of heat which develops as a result of slip between the clutch disc 3b and the flywheel 7 is disregarded. For example, and as already mentioned hereinbefore, the heat denoted by the arrow 100 in the schematic diagram of FIG. 6 can amount to approximately 50% of overall heat developing when the pressure plate 3a and the flywheel 7 are caused or permitted to slip relative to the respective friction linings of the clutch disc 3b. The square 101 denotes the pressure plate 3a and the arrow 102 denotes that portion of heat (arrow 100) which is stored in the pressure plate. The arrow 103 denotes that part of friction energy (friction heat) which is led away from the pressure plate (3a=101) as a result of conduction or convection.

The sum of heat or friction energies denoted by the arrows 101 and 102 equals or at least approximates the heat input (arrow 100) into the pressure plate 3a. The latter is assumed to be a simple pressure plate (also called a single-mass model) having a heat absorbing capacity denoted by the square 101. Thus, the rise of temperature is attributable to the thermal absorption capacity of the pressure plate (square 101) and the difference between the inflowing and outflowing quantities of heat.

The diagram of FIG. 7 shows a twin mass model 110 which can be said to constitute or denote an entire torque transmission sysem (such as the friction clutch 3) or a part (such as the pressure plate 3a) of the entire system. The total quantity of inflowing heat is denoted by the arrow 111 whereas the arrows 112, 113 denote the quantity of removed or withdrawn heat (either from the entire torque transmission system or from one of its parts, such as the aforementioned pressure plate). For example, the arrow 112 can denote that quantity of heat which is withdrawn by conduction, and the arrow 113 can indicate that percentage of heat denoted by the arrow 111 which is withdrawn by convection. The broken lines 114 denote the sum of the masses of the clutch parts 115, 116, and the heat absorbing capacities of these parts are respectively shown at 118 and 120. In order to calculate the temperature of the model 110, it is assumed that the clutch parts 115, 116 constitute two discrete masses of a pressure plate (114). The two masses are connected to each other in a thermally conductive manner by specifically selected heat.

The inflowing stream 111 of heat is divided into a stream 117 which heats the mass 115 (having the aforementioned heat capacity 118) and a stream 119 which flows from the mass 115 to the mass 116 (the latter having the heat capacity 120). The stream 119 is divided into a stream 121 and a stream 122. The latter stream, in turn, is divided into the aforementioned streams 112 and 113. The stream 117 heats the mass 115, and the stream 121 heats the mass 116. The arrow 119 further denotes the exchange of heat which takes place between the masses 115, 116 in dependency upon the temperature differential. Since the mass 116 is normally cooler than the mass 115, the exchange of heat (arrow 119) takes place in a direction from the mass 115 to the mass 116. Friction heat develops in the region of the mass 115 having the heat capacity 118.

Though the diagram of FIG. 7 shows the distribution of heat in and the dissipation of heat from a twin-mass constituent (such as a pressure plate) of a torque transmission system, it is equally within the purview of the invention to control the transmission of torque by a torque transission system of the type wherein at least one of the parts comprises more than two discrete masses.

Figure 8:
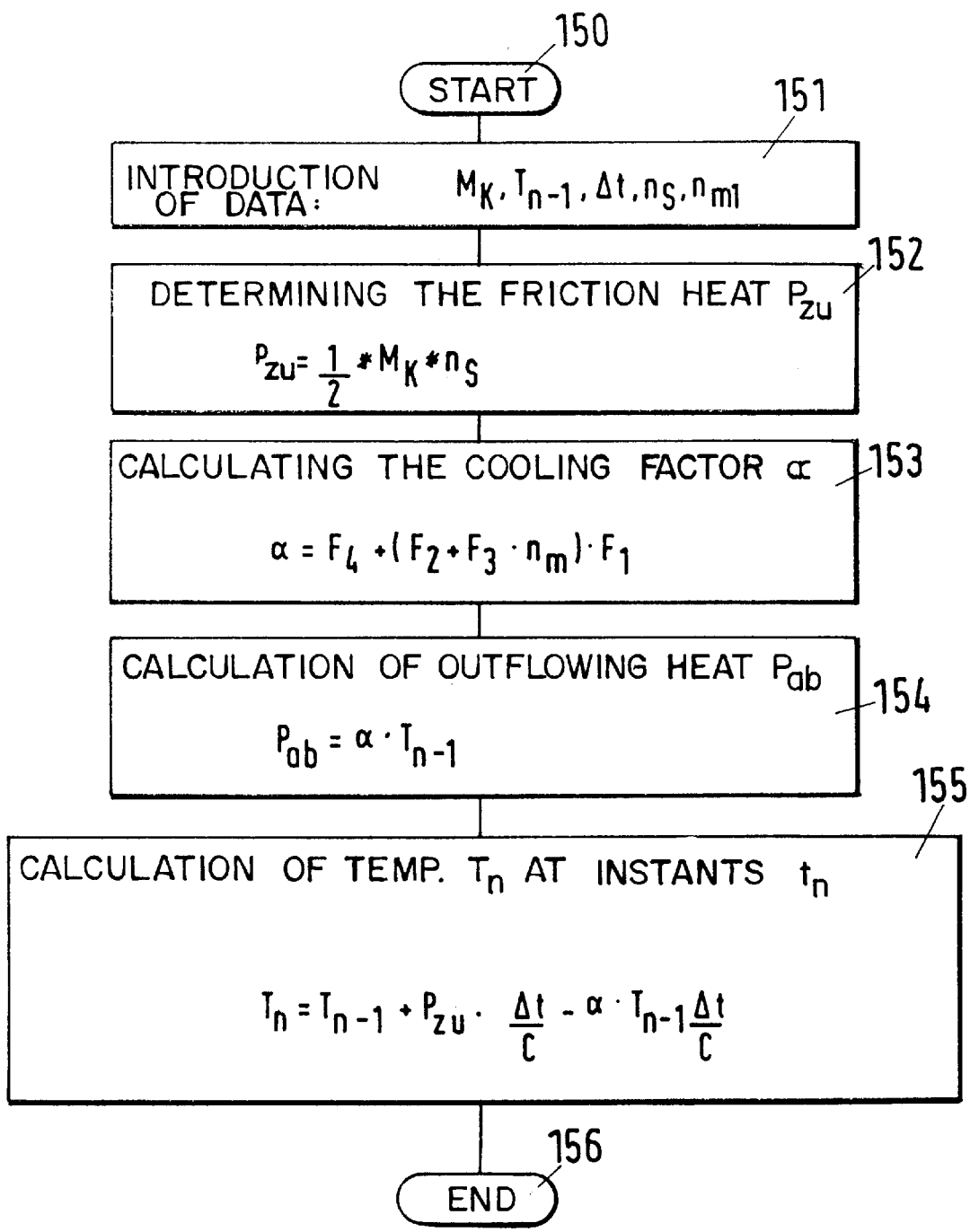
FIG. 8 is a block diagram of a routine which can be carried out in accordance with the method of the present invention.

FIG. 8 is a block diagram showing the manner of calculating a temperature $T_n$ at an instant $t_n$, e.g., the temperature of the pressure plate (such as 3a) in a friction clutch (such as 3). It is assumed that the pressure plate has a single mass exhibiting a given heat absorbing capacity. The routine or the calculating procedure is started at 150. Such starting can take place periodically with a time delay $\Delta t$ and such delay can denote a fixed (unchanging) value or can be varied as a function of changes in operating conditions. As a rule, the determination of temperature will be regulated at a cycle count or cycling frequency which can constitute the processor rate or a multiple thereof.

Block 151 denotes introduction of various data, signals and/or values which are necessary for a determination of the temperature. Such information can be furnished by the aforediscussed sensors or is stored in one or more memories or is ascertained, for example, by way of a data bus. The data which are furnished at 151 can denote, for example, the actual clutch torque $M_K$, the temperature $T_{n-1}$ at the instant $t_{n-1}$, $\Delta t$, the engine RPM $n_m$, the slip $n_s$, the RPM at the input to the transmission, the RPM of the driven wheels and/or other information.

The block 152 denotes the calculation of the quantity of heat (friction input) $P_{zu}$ in accordance with the equation $P_{zu}=\frac{1}{2}*M_K*n_s$. The constant ½ is necessary for the aforediscussed reason, namely because it is assumed that only one-half of the developing friction heat or friction output flows into the pressure plate and the remaining percentage of the friction heat is led away by way of the flywheel. The constant ½ is changed if the dimensions of the flywheel, as compared with the dimensions of the pressure plate, warrant such departure. As also mentioned hereinbefore, the pressure plate can be designed to lead away between about 25% and 75% of the total friction heat.

The block 153 denotes the calculation of the cooling factor α which determines the: withdrawn friction energy. One first considers a term or factor which is independent of the RPM and thereupon at least one factor or term which is dependent upon the RPM (engine RPM). The cooling factor is determined in accordance with the following equation: $\alpha=F_4+(F_2+F_3*n_m)*F_1$ wherein $n_m$ denotes the engine RPM and, in this embodiment, the factors $F_1$ to $F_4$ denote fixed numerical values which are stored or implemented. The aforementioned factors $F_i$ (with i=1 to 4) can also be calculated or ascertained from characteristic fields as a function of temperature. It is presently preferred to select the factors $F_1$ to $F_4$ within the value range of between 0 and 10 and certain of these factors can also depend upon given parameters, such as the engine RPM. The factor $F_2$ preferably equals zero when the RPM is less than 300, and equals one or exceeds zero for rotational speeds above 300 per minute. By way of example only, $F_1$ can equal 1.04, $F_3$ can equal 0.00016, and $F_4$ can equal 0.08. In this example, the value of α rapidly rises at an RPM of 300 from zero to one and continues to increase in response to increasing RPM.

If the calculated temperature exceeds or is below a given threshold value, the further utilized temperature can be assigned a fictitious value, especially at the upper or lower limit of a range or interval, and such value will be utilized as a basis for further calculation. If the ascertained temperature is within the selected range of temperatures, the actual temperature is utilized as a basis for further calculations. Depending upon the circumstances, the selected interval or range can be between 0 and 400°, especially within the range of 80–90 to 250–300°.

The block 154 of the block diagram shown in FIG. 8 denotes the calculation of the outflowing or led-away heat output at the instant $T_n$ with $P_{ab}=\alpha*T_{n-1}$ in dependency upon temperature $T_{n-1}$ at the instant $t_{n-1}$, i.e., the preceding instant. The temperature Te at the instant $t_{n-1}$ is also calculated with $T_{n-1}$.

The block 155 in the block diagram of FIG. 8 denotes the calculation of the temperature $T_n$ at the instant $t_n$ by resorting to the following equation:

$$T_n=T_{n-1}+P_{zu}*\Delta t/C-\alpha*T_{n-1}*\Delta t/C.$$

This means that, at the instant $t_n$, the temperature is dependent from the temperature at the instant $t_{n-1}$ plus a factor or term which takes into consideration the quantity of outflowing heat which, in turn, is dependent upon the temperature at the instant $_{n-1}$. During the next-following calculation interval, the temperature $T_n$ is again utilized as the temperature $T_{n-1}$ in order to ascertain the next-following temperature.

The routine is terminated at 156 and the actual value of the temperature $T_n$ is either memorized or transmitted for further processing.

Figure 9:
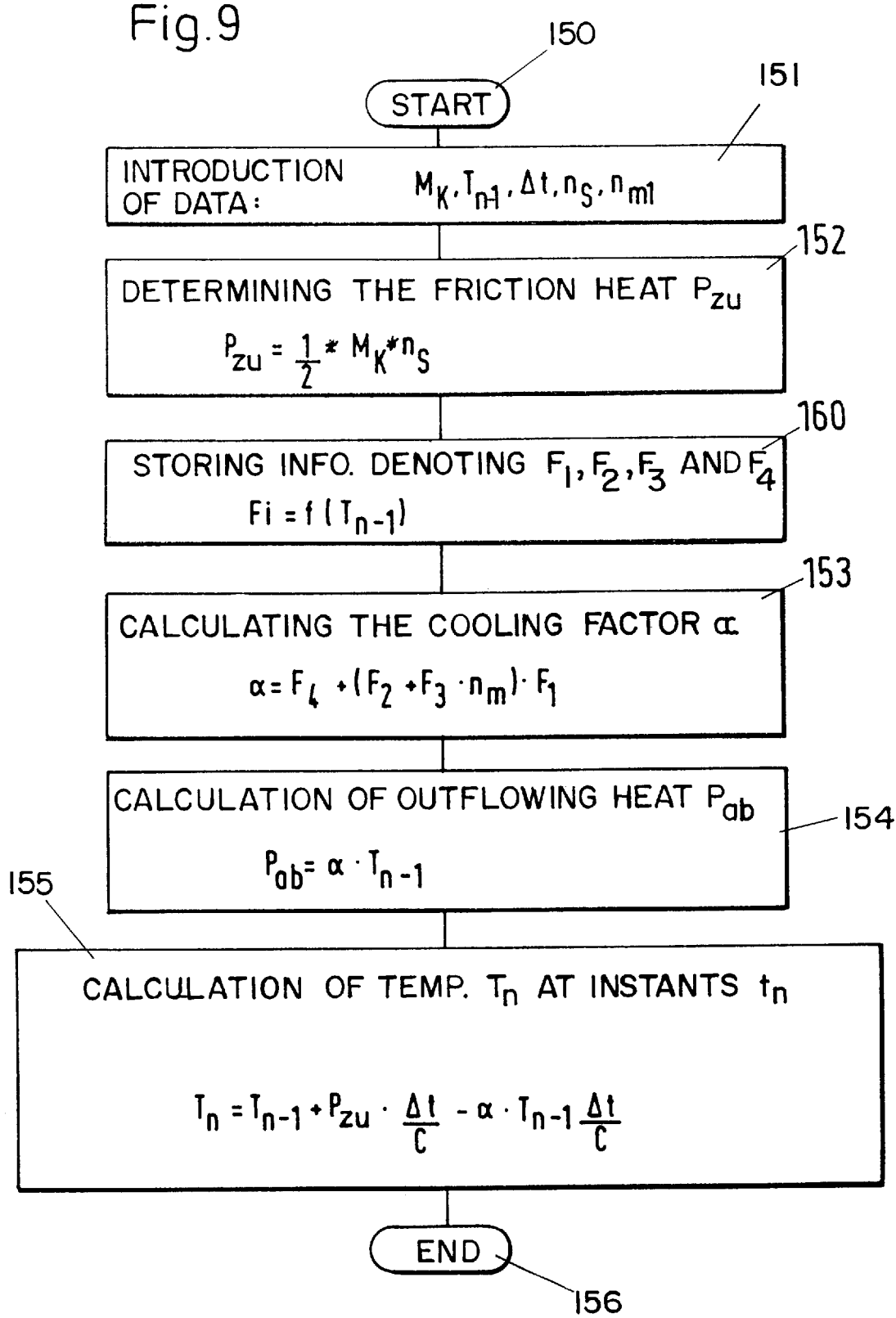
FIG. 9 is a block diagram of a second routine.

FIG. 9 shows a block diagram which corresponds to that of FIG. 8 except that it includes an additional block 160 (shown between the blocks 152 and 153) which stores information denoting the factors or values $F_1$ to $F_4$. $F_i=f(T_{n-1})$, i.e., the values of the summands and factors for determination of the cooling factor $\alpha$ can, in turn, also constitute functions of the temperature. Analogously, the heat capacity C can also be considered as a function of the temperature.

Figure 10:
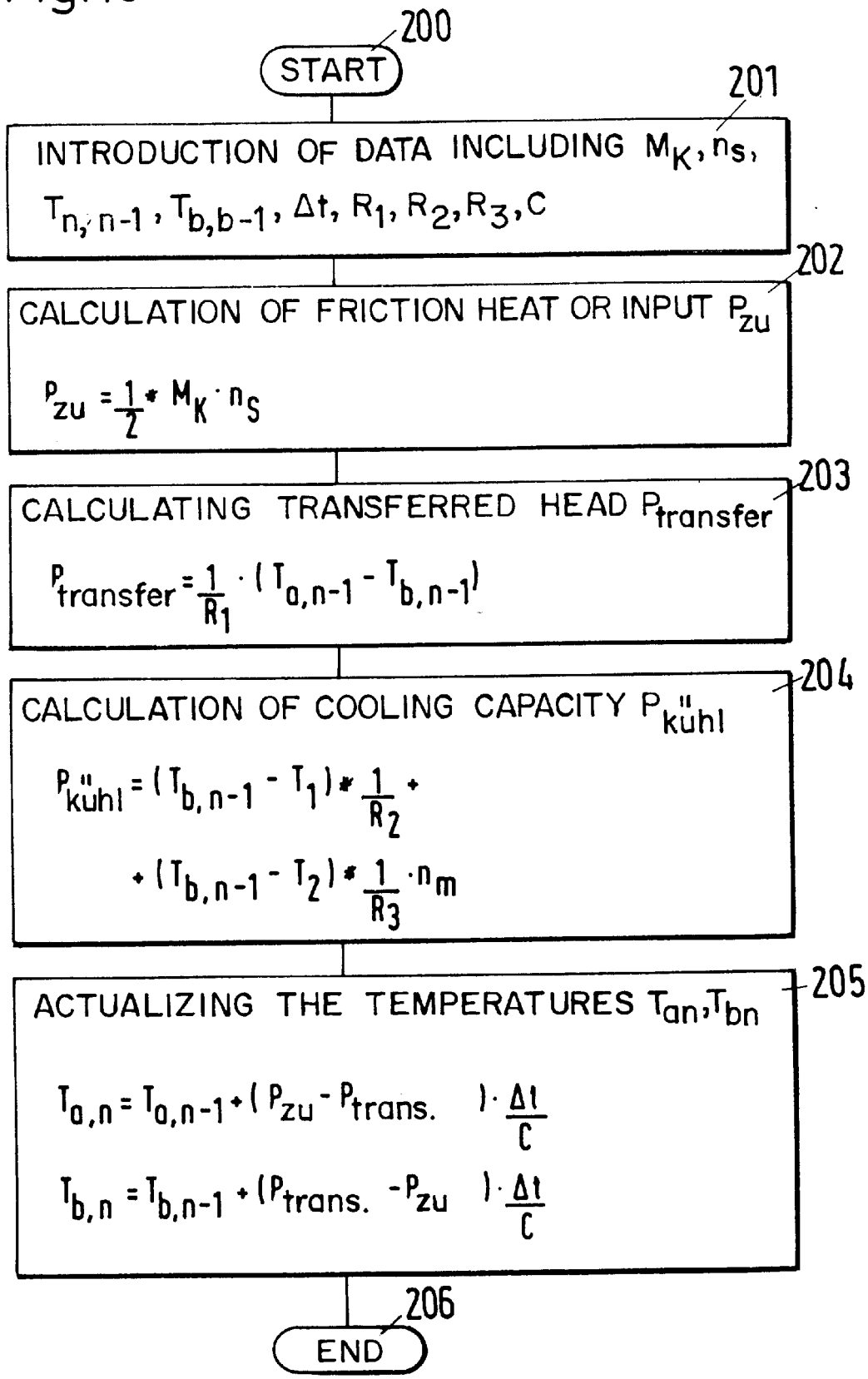
FIG. 10 is a block diagram of a third routine.

The block diagram of FIG. 10 is indicative of the calculation of the temperatures $T_a$ and $T_b$ when one employs a twin-mass model, e.g., a twin-mass pressure plate (3a). The calculation is started at 200 and the start is carried out at a clocking $\Delta t$, i.e., the start is repeated periodically or cyclically at a given clock frequency. The difference $\Delta t$ between successive start calls of the procedure or routine can be variable and is preferably less than one second. The block 201 of the diagram shown in FIG. 10 denotes the introduction of system data including the clutch torque $M_K$, the slip RPM $n_s$, the engine RPM $n_m$, the temperatue $T_{a,n-1}$ of the mass 115 (FIG. 7), the temperature $T_{b,n-1}$ of the mass 116 (FIG. 7), both at the instant $t_{-1}$, the time differential $\Delta t$ between two stages of the routine, and the heat capacity C as well as the heat transfer values or heat resistances $R_1$, $R_2$ and $R_3$.

The block 202 of the diagram shown in FIG. 10 denotes the calculation of the friction output $P_{zu}$ in accordance with the equation $P_{zu}=\frac{1}{2}*M_k*n_s$.

The block 203 in the diagram of FIG. 10 denotes the calculation of output or heat quantity which is transferred between the masses 115 and 116 (FIG. 7) in accordance with the equation: $P_{transfer}=1/R_1*(T_{a,n-1}-T_{b,n-1})$. Such transferred output corresponds to or can be interpreted as a heat conducted between the masses 115, 116 of the twin-mass pressure plate which was discussed with reference to FIG. 7.

The block 204 of FIG. 10 denotes the calculation of the cooling capacity $P_{kühl}$ one component of which is the result of convection and is a function of RPM, and the other component of which is attributable to conduction to the surrounding atmosphere. The calculation takes place in accordance with the following equation:

$$P_{kühl}=(T_{b,n-1}-T_1)*1/R_2+(T_{b,n-1}-T_2)*1/R_3*n_m.$$

The temperatures $T_1$ and $T_2$ correspond to reference values for temperatures which actually develop in the system or which are taken up as reference values. For example, the temperature $T_1$ can constitute the assumed or actual temperature of the atmosphere surrounding the thermal conductor, and the temperature $T_2$ can constitute a reference value for the convection.

The block 205 in the diagram of FIG. 10 denotes the actualizing of the temperatures $T_{an}$ and $T_{bn}$, and the block 206 denotes the completion of the routine.

The actualization as denoted by the block 205 is carried out in the following way:

$$T_{a,n}=T_{a,n-1}+(P_{zu}-P_{transfer})*\Delta t/C,$$

and $$T_{b,n}=T_{b,n-1}+(P_{transfer}-P_{kühl})*\Delta t/C.$$

The temperatures $T_{a,n}$ and $T_{b,n}$ at the instant $t_n$ are arrived at from the temperatures $T_{a,n-1}$ and $T_{b,n-1}$ plus a factor. Each such factor takes into consideration the energy balance between the quantities of supplied and withdrawn heat multiplied by the time differential $\Delta t$ between the times $t_n$ and $t_{n-1}$ and divided by the capacities C.

In the block 205 of the diagram shown in FIG. 10, the heat capacities for the calculation of $T_{a,n}$ and $T_{b,n}$ are assumed to equal C which is based on the assumption that the thermal capacities 118, 120 of the respective masses 115, 116 are the same. The just described circumstances merely refer to one of several embodiments because it is equally within the purview of the invention to select a different division or distribution, i.e., in such a way that one takes into consideration two masses or partial masses having different heat capacities C1 and C2. The thermal capacity C or the thermal capacities C1, C2 (to Cn) of the partial masses can constitute constants or they can constitute variable temperature-dependent values. The dependencies of the thermal capacities upon the temperature can be ascertained from characteristic fields or in accordance with a mathematical equation. It is presently considered to be of advantage if the thermal capacity in a given or impending interval of time is deemed to constitute an essentially linear value. This renders it possible to achieve savings in storage capacity of the memory in the case of utilization of characteristic fields or equations.

Figure 11:
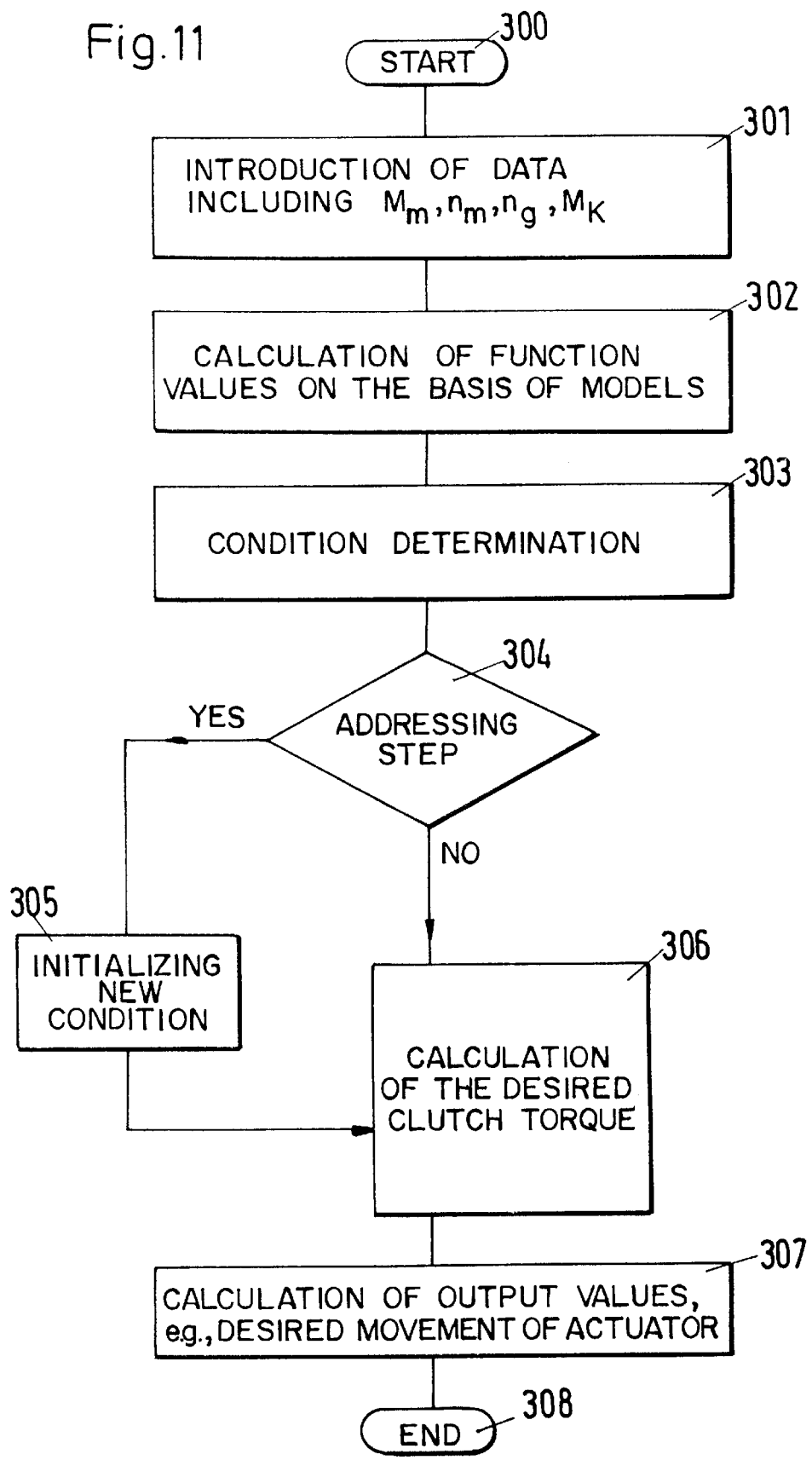
FIG. 11 is a block diagram of a fourth routine.

FIG. 11 shows a flow chart denoting the regulation of a torque transmission system. The routine is started at 300 and the block 301 denotes the introduction of system input data or values, input values, measured values and/or signals, or such information is obtained from one or more memories. For example, the introduced signals can denote the engine torque $M_m$, the slip RPMs $n_s$, the engine RPM $n_m$, the transmission input RPM $n_g$, the RPM of the wheels, the actual clutch torque $M_K$, the speed of the transmission, a signal denoting the intended selection of transmission speed, an indication of the position of the throttle valve, as well as other information, e.g., information which can be supplied by way of a data bus.

The block 302 of the flow chart shown in FIG. 11 denotes calculation of function values on the basis of models, such as for example the temperature of the clutch or its pressure plate. For example, the block 302 can denote a procedure of the character already described with reference to the diagrams shown in FIGS. 8 to 10.

The block 303 denotes the carrying out of a routine for determination or ascertainment of one or more conditions or circumstances. For example, one can resort to the signals or values entering at 301 and compare such information with reference values to ascertain the starting condition or the actual transmission speed. As already described above, the starting condition can be indicative of whether a transmission speed is selected and/or whether the load lever has been actuated and the RPM at the input of the transmission is less than the idling RPM and/or whether the torque transmission system operates with slip.

For example, a shifting procedure can be identified by triggering an intention to shift while the load lever is not actuated.

In the event of recognition or detection of a condition, such as for example a starting condition, there follows an addressing step (denoted by the block 304) in order to ascertain whether or not the detected condition is a different (new) condition or the same as the one recognized or detected during the preceding addressing step. If the ascertained condition is new, such condition is initialized at 305, i.e., it is necessary to select the limits or marginal values for the calculation, for example, of the actual desired or required clutch torque $M_K$ in dependency upon the prevailing or selected conditions. This is deemed to be necessary because the torque transmission system is regulated in a first way in the course of a clutch engaging operation and in a different second way for the purpose of changing the speed of the transmission. Under such circumstances, the aforementioned limits or marginal values determine the speed as well as the nature of closing or engagement of a clutch or an analogous torque transmission system.

The block 306 in the diagram of FIG. 11 denotes the calculation of the desired clutch torque, and such calculation takes place by resorting to the actual operating point on the basis of data ascertained in a manner described above with reference to the blocks 301 and 302.

The block 307 denotes, by way of example, the selection and setting by the control unit (such as 13), and based on the calculation of the desired clutch torque (at 306), the required distance to be covered by the clutch disengaging means in order to set the torque transmission system for the transmission of desired or required torque.

The block 308 denotes the termination of the routine.

Figure 12:
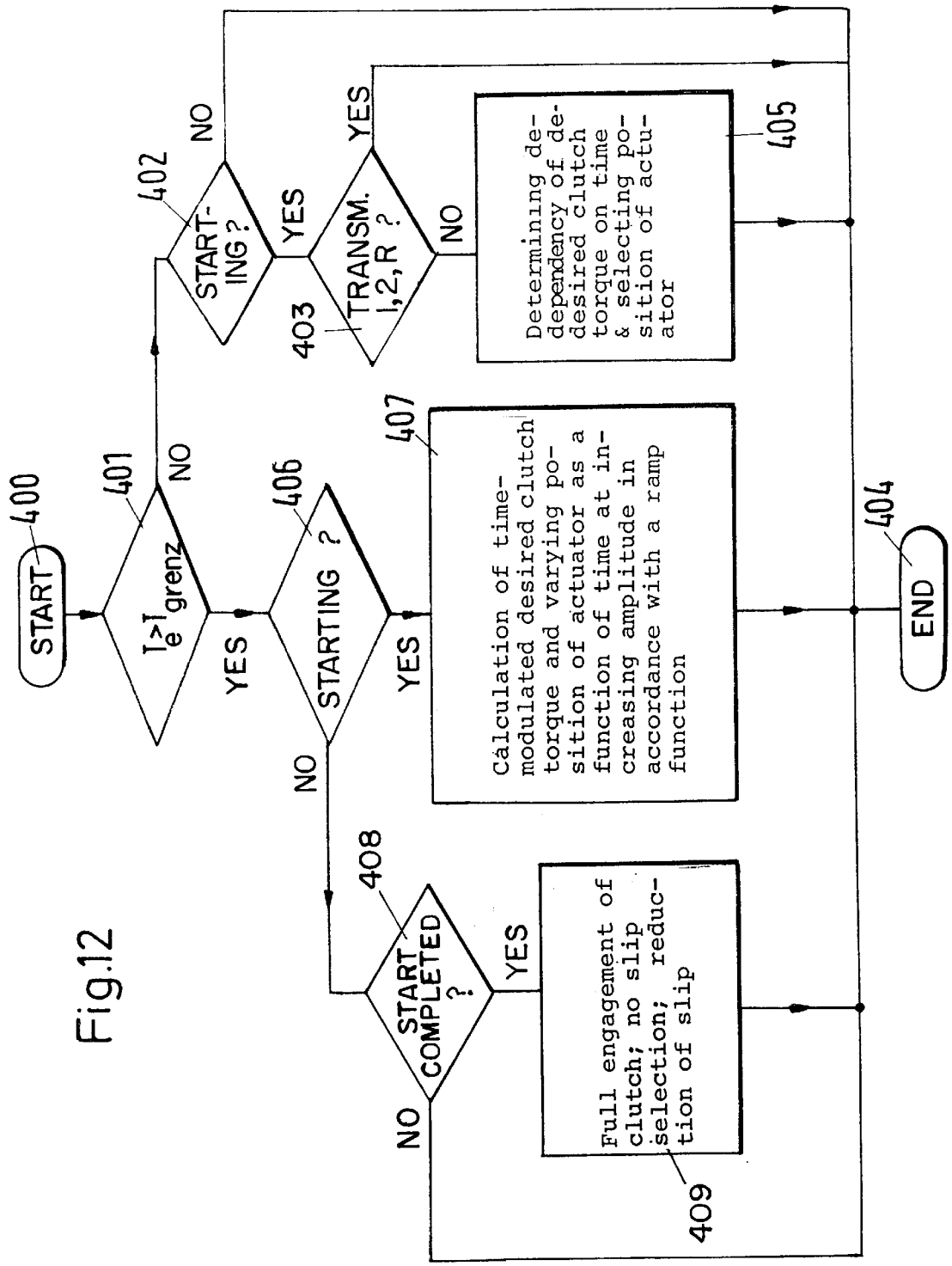
FIG. 12 is a block diagram of a fifth routine.

FIG. 12 is a block diagram which explains the progress of regulation of the system which prevents an overheating of certain component parts of a motor vehicle. The block 400 denotes the start of a routine and, as a rule, such starting will take place at a millisecond- to second frequency. Even higher frequencies are possible by utilizing high-output processors. It is presently preferred to operate at frequencies within the range of between 0.1 millisecond and 100 milliseconds.

The block 401 denotes a comparison of the calculated or ascertained temperature Te, or at least one of the temperatures $T_a$, $T_b$, etc., if ascertained, with a specific threshold value $T_{Grenz}$ or $T_{a\text{-}Grenz}$, $T_{b\text{-}Grenz}$, etc. in order to render it possible to ascertain whether or not the temperature has exceeded a critical threshold value at the instant $t_n$. It is also possible (in a manner not specifically shown) to sample the existence of a critical condition of the vehicle, for example, whether or not the vehicle was arrested on a sloping road surface without the actuation of one or more brakes because such stoppage of the vehicle can be achieved in response to partial engagement of the clutch so that the latter transmits a torque which suffices to hold the vehicle against movement on the sloping road surface. For example, such situation can be ascertained on the basis of a determination that the output RPM is zero or practically zero, that the clutch is at least partially engaged, and that the clutch operates with slip while the load lever is actuated.

The block 402 in the diagram of FIG. 12 denotes the determination whether or not the then prevailing condition of the vehicle is a starting condition. For example, a starting condition can be recognized or detected or ascertained by determining that the load lever has been actuated but the idling switch is not actuated while the engine RPM exceeds the idling RPM and a transmission RPM is less than the engine RPM, the transmission being set at one of the speeds and a slip prevails in the torque transmission system. The load lever is monitored by one or more sensors which monitors or monitor the position or the actuated condition. The signal or signals from such sensor or sensors render it possible to ascertain whether or not the operator of the vehicle has initiated or is actually carrying out a starting procedure while the load lever (such as a gas pedal) is actuated.

The block 403 in the diagram of FIG. 12 denotes the determination, based on signals furnished by one or more sensors, whether or not the operator of the vehicle has selected a transmission speed other than the first or second forward speed or the reverse speed (e.g., the third or fourth forward speed). The sensor or sensors which transmit appropriate signals for such determination include at least one position monitoring sensor which (as already described hereinbefore) ascertains the selected or set transmission speed by monitoring the position of an internal or external transmission component such as a centrally located shifting or switching shaft.

If the result of a determination at 402 is negative, i.e., the condition of the vehicle is not that which constitutes a condition for or during starting, the routine is terminated at 404. It is to be noted that the condition "starting" need not necessarily entail or result in an acceleration or driving (forward or rearward movement) of the motor vehicle. For example, if the transmitted torque is insufficient to accelerate a vehicle which is located on a sloping road surface, a condition which can be termed a start or starting condition exists or prevails even if the vehicle remains at a standstill or rolls rearwardly while attempting to advance along an upwardly sloping road surface.

If the determination at 402 is positive, the actually selected transmission speed or the selected transmission ratio is ascertained at 403. This involves a determination whether or not the selected transmission speed is a speed which is selected to start the vehicle, such as the first or second forward speed or the reverse speed. These are the transmission speeds which are normally provided for the starting of a vehicle embodying a standard commercially available transmission. If the determination at 403 is in the affirmative, i.e., the vehicle is in the process of being started, the routine is terminated at 404. However, if the procedure denoted by the block 403 results in a determination that no starting condition exists (e.g., that the transmission is set for a third or fourth forward speed which could result in extensive or excessive wear during starting of the vehicle with such speed setting of the transmission), a safety strategy or a shielding or protection against excessive wear and/or against overheating is carried out in a manner as denoted by the block 405.

The operations represented by block 405 in the diagram of FIG. 12 denote a calculation or determination of a time-modulated desired clutch torque by the control unit. Certain clutch torques of such character are denoted by the curves in the diagrams of FIGS. 2, 3 and 4 as well as in the diagram of FIG. 13. Thus, by modulating and/or otherwise varying the desired clutch torque and by controlling the selector for the transmission of torque by the torque transmission system accordingly, by resorting to a desired value which varies as a function of time, there are induced in the power train of the motor vehicle oscillations or vibrations which draw the operator's attention to the critical condition of the torque transmission system while the operator continues to be free to drive the vehicle in a desired manner. The routine is terminated at 404. The just outlined condition of time-dependent modulation of the desired clutch torque remains unchanged until the starting procedure is completed or the operator has shifted the transmission into a different speed ratio or the transmission has automatically selected a different speed ratio. Otherwise stated, the above outlined condition remains unchanged until the control unit receives a signal denoting the intention to shift the transmission into a different speed.

If the operation denoted by block 401 results in a determination that at least one predetermined or calculated temperature exceeds a threshold value, the operation denoted by the block 406 involves a determination whether or not the vehicle is in the process of being started. This can take place in a manner as described with reference to the block 402. Another possibility involves the provision of a characteristic memory bit for each condition, such as starting, driving, shifting, braking and others, as soon as the existence of such condition is ascertained. For example, the control unit 13 can address the memory bit by way of a data bus in order to ascertain whether or not the then prevailing condition is that which is characterized as starting.

If a starting procedure is indicated at 406, a time-modulated desired clutch torque can be ascertained or calculated at 407. For example, a time-modulated clutch torque can be of the nature denoted by the curve shown in FIG. 2 or 3, and it has been found to be of advantage if the amplitude increases at the start, when considered as a function of time, with a ramp function. In order to realize a thus determined desirable clutch torque or transmittable desired torque, one proceeds by determining and initiating a prorated value for the actor. The routine is terminated at 404 and the starting of the torque transmission system to transmit torque at an amplitude which varies as a function of time proceeds until the temperature drops and no longer exceeds the threshold value or the condition "starting" is terminated.

If the operation denoted by the block 406 does not indicate a starting condition but rather a driving or shifting condition, as determined at 408, the clutch is at least substantially fully engaged when the indicated condition is driving or the shifting operation is completed. This is indicated at 409 and the at least nearly completely engaged clutch continuously or at least temporarily prevents the development of slip in the torque transmission system to thus avoid any stressing of such system due to the development of friction heat. The routine is terminated at 404.

Figure 13:
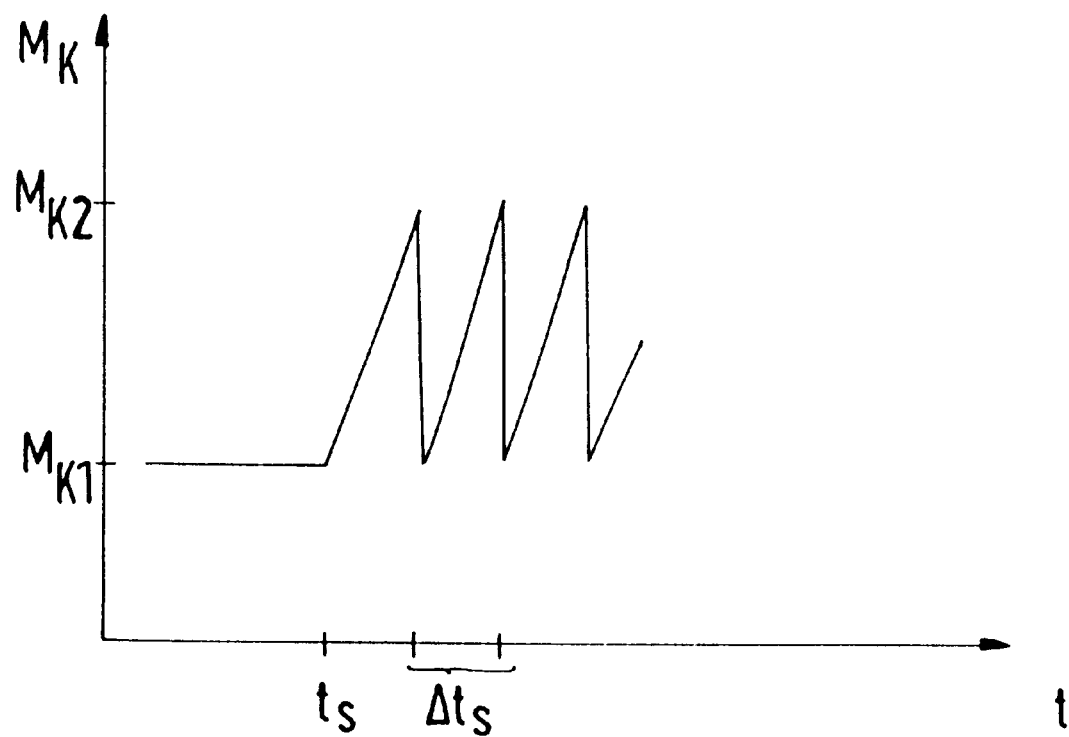
FIG. 13 is a diagram similar to those of FIGS. 2, 3 and 4 but showing a curve which denotes still another form of torque adapted to be transmitted by resorting to the method and apparatus of the present invention.

The curve in the diagram of FIG. 13 indicates the progress of the desired clutch torque $M_K$ as a function of time $t$. The desired torque begins to vary at the instant $t_s$, for example, because the starting of the engine was initiated at the same instant $t_s$. The torque $M_K$ increases from a value $M_{K1}$ to a value $M_{K2}$ before the amplitude begins to decrease. The durations of successive intervals during which the torque $M_K$ increases from $M_{K1}$ to $M_{K2}$ to thereupon abruptly drop from $M_{K2}$ back to $M_{K1}$ are indicated at $\Delta t_s$. The amplitudes of the variations between $M_{K2}$ and $M_{K1}$ can be caused to vary as a function of time.

As already mentioned hereinbefore, the control unit (such as 13) can include means for ascertaining on the basis of one or more signals and as a function of time (a) a friction energy input at the friction surfaces of the torque transmission system (such as the friction clutch 3) and (b) at least one temperature of the torque transmission system, and such ascertaining means can include means for calculating and/or otherwise determining the temperature by taking into consideration a cooling effect due to convection and as a function of RPM, particularly the RPM of the prime mover (such as the engine 2). It can be of advantage if the considered cooling effect includes several portions or shares including a portion which is dependent upon RPM due to convection or a portion which is proportional to the RPM.

A further important object of the present invention is to ensure that a motor vehicle embodying a torque transmission system whose operation is regulated by an adjustable device (such as the actor 9–12) which responds to output signals from a control unit (such as 13) be operable (such as adapted to be started, accelerated and driven) under certain extreme circumstances in order to enhance the safety of the occupant or occupants of the vehicle. An undesirable extreme situation can arise, for example, when the energy input into the torque transmission system increases above a given value. Adequate manipulation of a vehicle, for example, in the just outlined extreme situation, not only contributes to safety of the occupant or occupants of the vehicle but also of the operators of other vehicles on the road and reduces the risk of pronounced damage to the vehicle embodying the novel apparatus as well as to other vehicles. At the very least, the improved apparatus greatly reduces the risk of pronounced damage and/or injury. This is in contrast to prior proposals which greatly limit the ability of a vehicle to continue to operate in accordance with commands furnished by the operator as soon as there develops an extreme situation or circumstance such as for example a disengagement of the..clutch in response to increased energy input.

An important advantage of motor vehicles wherein the operation of the torque transmission system is regulated by an actor which, in turn, is adjustable by a computer is that the ride is quite comfortable to the occupant or occupants of the vehicle. For example, such controls for the torque transmission system render it possible to start the vehicle while the transmission is set to operate at a speed higher than the second forward speed. However, and as already explained hereinbefore, the starting of a motor vehicle with the transmission set for operation at a third (or even higher) forward speed is considered to amount to a critical condition. For example, if the vehicle is started with the transmission set for operation at the fourth forward speed, the clutch will operate (at least for a certain interval of time) with a rather pronounced slip which, in turn, causes pronounced wear and results in a higher energy input (due to friction) than if the vehicle were started with the transmission set for operation at the first forward speed.

The improved apparatus renders it possible to start the vehicle with the transmission set for operation at a third or even higher forward speed, and such starting can or could proceed without any signal to the operator of the vehicle that the operation of the vehicle is in a stage which is or which can be considered to be critical. In other words, it is possible to start the vehicle with the transmission set at a speed above the first or even second forward speed, and the operator will be able to control the vehicle in an expected manner but without knowing that the wear upon the friction linings and/or other parts of the clutch is excessive, at least during the initial stage of starting. Therefore, it is desirable and advantageous to construct the improved apparatus and to devise the improved method in such a way that the operator is made aware of the criticality or undesirability of the momentarily existing or prevailing condition or situation, either immediately or with a relatively short delay. The signal or signals to the operator are preferably of such nature that the operator is made aware of the desirability of altering the mode of operation in order to prolong the useful life of the engine, of the clutch and other component parts of the power train. However, such signal or signals are being transmitted to the operator without affecting the operator's ability to properly control the vehicle, i.e., the development of a critical situation should be reported to the operator but in such a way that it is up to the operator to change the mode of operation of the vehicle. Thus, the ability of the vehicle to continue to operate under the developing critical conditions continues to exist.

It is to be noted that the position of the torque transmission system in the power train of a motor vehicle can be changed (to depart from that shown in FIG. 1) without departing from the spirit of the present invention. For example, the improved apparatus can be utilized to regulate the operation of a torque transmission system which is installed in the power train upstream (ahead) of or downstream of (behind) the variable-speed assembly (such as the transmission 4 in the power train of the vehicle 1 shown in FIG. 1). All that is necessary is to influence the dynamic behavior of the vehicle in response to the detection of a critical condition or situation, such as excessive energy input into or an overheating of a portion of or the entire torque transmission system. Alternatively, and as also described hereinbefore, the improved apparatus can detect the likelihood or the imminence of the development of a critical condition and can ensure that the mode of operation of the vehicle is changed before the critical situation develops.

If the torque transmission system operates with slip while the vehicle is brought to a halt on a sloping road surface and while none of the vehicle brakes are in use, the dynamic behavior of the vehicle involves, for example, setting a portion of or the entire power train into vibratory motion which is sufficiently pronounced to be readily detectable (felt) by the operator because the entire vehicle is caused to vibrate. The operator thus determines that the condition of the vehicle is critical, i.e., that it is advisable to undertake one or more steps in order to avoid excessive and premature wear upon the torque transmission system or upon the entire power train. In fact, the selected dynamic behavior of the vehicle in response to the development of the aforementioned or another critical condition can be so drastic (e.g., the vibratory movements can be so pronounced) that the operator is more or less compelled to undertake the necessary remedial step or steps. If the vehicle is intended to be at a standstill while its condition can be termed to be critical because the torque transmission system operates with an excessive slip, the signal to the operator can involve a creeping of the vehicle along the inclined road surface which suffices to inform the operator that a certain action must be undertaken, e.g., that the operator should apply the hand brake and/or the foot brake.

It is presently preferred to select the signal (such as vibration and/or creeping of the vehicle) in such a way that the notification of the operator is not too drastic, i.e., that neither the operator nor any other occupants of the vehicle nor the vehicle are likely to be overly affected by the signal or signals. For example, the detectability of signals in the form of vibratory movements can be enhanced by selecting for the signals a sequence and/or amplitude which varies periodically or aperiodically, e.g., in a manner illustrated by the curves in the diagrams of FIGS. 2, 3 and 4.

Of course, the improved apparatus can also serve to anticipate a critical condition of the vehicle or of one or more component parts of the power train and to generate signals which cause the actor to regulate the operation of the torque transmission system in a manner which prevents the development of the critical condition and/or which informs the operator that the necessary remedial undertakings are being carried out or are about to be carried out automatically or should be carried out by the operator. The apparatus can anticipate the development of a critical condition by properly processing various signals which are being transmitted to its inputs by the respective sensors and/or from other sources such as information stored in one or more memories. For example, the apparatus can proceed to calculate the advent of a critical situation when the monitored temperature of one or more parts of the torque transmission system reaches a predetermined value which is still at least slightly below the maximum permissible temperature (reference may be had again to the diagram of FIG. 5) and/or when the slip between the flywheel 7 and the pressure plate 3a on the one hand and the clutch disc 3b on the other hand reaches a value which is still acceptable (as far as the extent of wear upon the torque transmission system is concerned) but is sufficiently high to warrant an advance determination of a critical condition which can develop unless the apparatus undertakes automatic remedial steps and/or at least some such steps are carried out by the operator in response to appropriate notification. Again, the signals to the operator (such as by way of the torque transmission system) can vary statistically, periodically or aperiodically and can involve vibration of the motor vehicle and/or creeping of the vehicle on a sloping road surface. It is further possible to intensify the signals to the operator of the vehicle if the remedial undertakings are to be carried out by the operator (at least in part) and such undertakings are not completed after elapse of a certain interval following initial detection of a critical condition or completion of a calculation that a critical situation is about to develop. This can take place when the temperature of one or more parts of the torque transmission system has risen to an unacceptably high value and/or when the slip of the torque transmission system reaches a level which should not be exceeded.

A relatively simple remedial action merely involves automatic changes in the magnitude of transmitted torque as soon as the condition of the vehicle (e.g., the temperature and/or the slip of the torque transmission system) reaches or begins to exceed a critical stage.

Another possible mode of informing the operator that the condition of the vehicle has reached a critical stage (e.g., while the vehicle is to remain at a standstill on a sloping road surface) is to cause the vehicle to creep in one direction (upwardly), to thereupon roll in the other direction (downwardly), to again creep upwardly and so forth which is bound to inform the operator of the condition of the vehicle, e.g., that the temperature of one or more parts of the torque transmission system is too high and/or that the slip is excessive. For example, the operator can react by applying one or more brakes. The changes in the direction of apparatus-induced (creeping and rolling) movements can be so frequent that the vehicle is caused to perform a quasi vibratory movement; alternatively, the frequency of changes in the direction of movement along the sloping road surface can be less pronounced so that the operator more readily detects the repeated changes in the direction of movement of the vehicle at a time when the vehicle should remain at a standstill.

It has been found that it is more likely that an operator will detect periodical, aperiodical and/or statistical chages in vibratory movements and/or other signals if such changes vary as a function of time and/or if the changes in intensity and/or other characteristics of the signals to the operator are rather pronounced, e.g., at constant or varying intervals of time.

The signal to the operator of the vehicle can be selected in such a way that it is represented by fluctuations of transmitted torque whereby the torque fluctuates above and below a preselected median value. The extent of such fluctuations can be said to be indicative of the intensity of the signal which is being transmitted to the operator and/or which is being used to eliminate the critical condition. The critical condition can develop as a result of overheating of one or more component parts of the torque transmission system, as a result of excessive energy input into the torque transmission system and/or as a result of prolonged wear due to slip. Such critical condition can be overcome automatically in response to signals from the control unit and/or by the operator in response to transmission of one or more visible, audible and/or otherwise detectable signals, or it can be prevented by causing the control unit to determine the potential development of a critical condition and to automatically (or via operator) prevent the development of such condition.

The control unit can be designed to generate signals which denote the likelihood of the development of a critical situation or the existence of such situation and which are used to prevent the actual development of critical situation or to remedy the existing critical situation and/or to warn the operator that the operation of the vehicle should be altered in order to prevent damage to a portion of the torque transmission system, to one or more parts of such system and/or to one or more other parts of the power train including the torque transmission system and the variable-speed assembly.

The signals which are being transmitted to and which are being processed or which can be processed by the control unit 13 or an equivalent or analogous control unit can include discrete signals or groups of signals such as those (furnished by one or more suitable thermometers) denoting the temperature(s) of one or more component parts of the torque transmission system and/or the variable-speed assembly, the RPM of the prime mover, the position of the throttle valve, the pressure in the suction manifold, the input RPM of the variable-speed assembly, the condition of one or more auxiliary components of the vehicle (such as a dynamo, the air conditioner and/or others), by one or more tachometer generators (such as the one shown at 17 in FIG. 1), the selected speed of the variable-speed assembly (such as the transmission 4), the output RPM of the variable-speed assembly, the clutch torque, the engine torque and/or others. The processing can involve the generation of signals which denote the impending development of a critical situation, which are used to prevent the development of a critical situation, which are used to remedy a critical situation and/or which are being transmitted to the operator of the vehicle.

The nature of signals which are to be processed by the control unit will depend on the nature of a critical situation which is about to develop or which already exists. Thus, the control unit can also receive signals which denote, among others, the anticipated selection of speed of the variable-speed assembly, the position of a hand brake, the position of a foot brake, the inclination of the vehicle to the horizontal, the RPM of the wheels, the position of the gas pedal, the actual torque being transmitted by the torque transmission system and/or the temperature of the surrounding atmosphere. These signals and/or the previously enumerated signals can be processed to ascertain and/or to remedy and/or to report critical conditions of any kind likely to arise when the vehicle is in use or is about to be used, such as overheating, excessive energy input, prolonged slip, attempt to arrest the vehicle on a sloping road surface without resorting to one or more brakes, attempt to start the vehicle while its wheels are blocked against rotation and/or others.

If the signal to the operator involves the transmission of torque which varies as a function of time, it is often advisable to select the amplitude of vibrations in such a way that it increases monotonously up to a predetermined threshold value and thereupon remains at least substantially constant, at least for a given interval of time. The threshold value will be selected as a function of one or more factors, for example, the nature of the critical situation which already exists or which is about to develop.

Instead of increasing monotonously, the amplitude of vibrations can increase in accordance with one or more simple and/or complex patterns. The same holds true for periodical or aperiodical or statistical reductions of the amplitude of vibrations which are to signal the existence or the likely development of a critical condition. For example, the amplitude of the vibrations can increase and/or decrease linearly, exponentially, stepwise, in accordance with a trigonometric function (such as sine or cosine) and/or otherwise. The intervals during which the amplitude of vibrations is constant, increases or decreases can be of equal length or can vary in accordance with any desired pattern. For example, intervals of vibrations whose amplitude increases can alternate with intervals of vibrations having a constant amplitude and/or with intervals of vibrations having a regularly or irregularly decreasing amplitude and/or with intervals of vibrations whose amplitude increases in accordance with a different pattern, and so forth. Still further, the just mentioned intervals can have identical lengths or different lengths and two or more successive intervals of identical length can alternate with one, two or more intervals having different lengths.

If the signals to be noticed by the operator are of a nature such that they involve an acceleration and/or a deceleration of the vehicle, it is often advisable to select the signals with a view to ensure abrupt acceleration and/or deceleration of the vehicle; this ensures that the operator will be notified of the existence of a critical condition but still in a manner which does not involve any risk to the occupant(s) of the vehicle and/or any undesirable damage to the vehicle.

The actor and the control unit of the improved apparatus can be assembled into a compact module which occupies a relatively small amount of space and can be installed in existing types of motor vehicles.

The disclosures of all U.S. patents which are enumerated in the specification of the present application are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A method of regulating the operation of a torque transmission system having heat generating friction surfaces, with a regulating device which is operable by a control unit, comprising the steps of transmitting to the control unit signals denoting at least the magnitude of torque being transmitted by the system, the extent of slip of friction surfaces relative to each other, the condition of the system and the selected speed of a variable-speed assembly receiving torque from the system; utilizing at least one of said signals to influence the input of energy by the control unit into the friction surfaces of the system, including selecting for the torque transmission system a mode of operation involving the transmission of torque within a range of torques above and below a predetermined median value; calculating the temperature of at least a portion of the system as a function of time; comparing the calculated temperature with a threshold value; and utilizing the control unit to regulate the operation of the system under at least one of the circumstances including (a) detection of a calculated temperature which exceeds the threshold value and (b) starting of a prime mover for the system at a speed of the variable-speed assembly above a predetermined maximum speed, said utilizing step further including generating at least one signal for at least one of (a) indication of excessive thermal stressing and (b) initiation of a corrective undertaking.

2. Apparatus for regulating the operation of a torque transmission system having heat generating friction surfaces slidable relative to each other, which is installed in a power train between a prime mover and a variable-speed transmission having first, second and additional forward speeds and a reverse speed, in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and at least one of (a) the extent of slip of the friction surfaces relative to each other and (b) the speed of the transmission, said control unit including means for ascertaining on the basis of signals denoting the speed of the transmission and the condition of the vehicle whether the transmission is set in an additional forward speed for starting of the vehicle and for carrying out at least one of a plurality of undertakings including generating output signals denoting excessive thermal stressing of said system due to starting of the vehicle at an additional forward speed of the transmission and initiating at least one of (a) correcting and (b) protective measures when the temperature of at least a portion of said system exceeds a predetermined threshold value.

3. Apparatus for regulating the operation of a torque transmission system having heat generating friction surfaces which are slidable relative to each other, which is installed in a power train between a prime move and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time (a) a friction energy input at said friction surfaces and (b) at least one temperature of said system, for comparing said at least one temperature with at least one threshold value, and for carrying out at least one of a plurality of undertakings including generating output signals denoting excessive thermal stressing of said system and initiating at least one of (a) corrective and (b) protective measures when the at least one temperature exceeds the at least one threshold value.

4. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input of said friction surfaces and for calculating at least one temperature of said system, for comparing said at least one calculated temperature with at least one threshold value, and for carrying out at least one of a plurality of undertakings including generating output signals denoting excessive thermal stressing of at least one predetermined portion of said system and initiating at least one of corrective and protective measures when the at least one calculated temperature exceeds the at least one threshold value, said initiating step including effecting an adjustment of said device for selection of a torque which varies as a function of time and entails a vibration of the power train.

5. The apparatus of claim 4, wherein said vibration includes at least one of periodic, aperiodic and statistical vibrations of the power train.

6. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said device being adjustable by said control unit to modulate the torque which is transmissible by said system so that the modulated torque fluctuates as a function of time.

7. The apparatus of claim 6, wherein a curve denoting said modulated torque is sawtooth shaped and has one of two amplitudes including a fixed amplitude and a variable amplitude.

8. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system and varies within a range including torque above and below a median value; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value.

9. The apparatus of claim 8, wherein the torque which is selected by said device further includes an initial value and said median value is one of a second range including torques matching, exceeding and less than said initial value.

10. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time (a) a friction energy input at said friction surfaces and (b) for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, the torques which are selected by said device in response to adjustment by said control unit being arranged to fluctuate as a function of time in accordance with one of a plurality of patterns including periodical, aperiodical and statistical fluctuations.

11. Apparatus for regulating the operation of a torque transmitting system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and for initiating at least one of corrective and protective measures when the at least one calculated temperature exceeds the at least one threshold value, said measures including effecting fluctuations of torque of a nature such that a ride in the vehicle is uncomfortable to the occupant or occupants of the vehicle.

12. The apparatus of claim 11, wherein at least one undertaking includes causing said device to select a torque which entails vibrations of the motor vehicle.

13. Apparatus for regulating the operation of a torque transmitting system having heat generating friction surfaces which are slidable relative to each other, which is installed in a power train between a prime mover and a variable speed assembly in a motor vehicle, comprising an adjustable device operable to select the torque which is transmittable by said system, and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said output signals being a function of signals denoting at least the extent of slip at least in said system and of signals denoting the magnitude of transmissible torque.

14. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said means for ascertaining being operative to generate said output signals in advance and being responsive to at least one of input signals indicating a critical condition of the vehicle including starting of the vehicle at a speed of said variable speed assembly higher than a second forward speed, bringing the vehicle to a halt on a sloping road surface while said system is at least partially engaged and without the application of one or more vehicle brakes, starting or driving the vehicle along a sloping road surface while the system is set for operation with slip, and an attempt to start the vehicle while the wheels of the vehicle are blocked against rotation.

15. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system, and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input of said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said means for ascertaining being responsive to at least one of a plurality of input signals indicating a critical condition of the vehicle including at least one of a friction energy input exceeding a predetermined value and pronounced wear upon said system, said plurality of input signals including signals denoting a selected speed of said assembly, the position of a first brake, the position of a second brake, the extent (if any) of inclination of the vehicle on a road surface, the RPM of the vehicle wheels, the RPM of the prime mover, the input RPM of the assembly, the position of an actuator in said system, the position of a throttle valve in the prime mover, the position of a gas pedal in the vehicle, the torque of said prime mover and the magnitude of transmissible torque, said control unit further comprising means for comparing said at least one signal of said plurality of signals with data in at least one memory of said control unit.

16. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said output signals being utilized to effect an adjustment of said device so as to effect constant, periodical, aperiodical or statistical fluctuations of transmitted torque.

17. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said output signals being utilized to effect an adjustment of said device so as to transmit a torque which increases monotonously as a function of time up to a predetermined threshold value and thereupon remains at least close to said predetermined threshold value.

18. The apparatus of claim 17, wherein said threshold value is selected as a function of said variable parameter indicating the condition of the vehicle and such variable parameter is one of a plurality of parameters including starting of the vehicle at one of a forward and a reverse speed of said assembly and maintaining the vehicle in one of (a) motion and (b) a standstill while said friction surfaces slip relative to each other.

19. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said output signals being utilized to effect an adjustment of said device so as to transmit a fluctuating torque having an amplitude which varies in accordance with a predetermined pattern up to a fixed or variable threshold value.

20. The apparatus of claim 19, wherein said pattern is determined by data stored in at least one memory of said control unit.

21. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said output signals being utilized to effect an adjustment of said device so as to transmit torque which fluctuates in accordance with at least one of a plurality of patterns including linearly, exponentially, stepwise, in sawtooth fashion, and in accordance with a trigonometric function including sine and cosine.

22. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said output signals being utilized to effect an adjustment of said device so as to transmit a torque of a magnitude which varies with successive length-modulated time intervals.

23. The apparatus of claim 22, wherein said adjustment of said device in response to said output signals is such that the amplitude of torque which is being transmitted within at least one of said intervals departs from the amplitude of torque being transmitted during at least one other interval.

24. Apparatus for regulating the operation of a torque transmitting system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said output signals being utilized to effect an adjustment of said device so as to transmit a torque of a magnitude which varies with successive time intervals of varying duration.

25. Apparatus for regulating the operation of a torque transmitting system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said output signals being utilized to effect an adjustment of said device so as to transmit a torque which varies as a function of time without adversely affecting the acceleration and motion of the vehicle.

26. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said output signals being utilized to effect an adjustment of said device so as to transmit a torque which varies as a function of time without affecting at least one of the condition and the operability of the vehicle as well as to denote at least one of (i) increased thermal stressing of and (ii) increasing wear upon said torque transmission system.

27. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said control unit further comprising means for predetermining a desired condition of the vehicle on the basis of at least one of a set of characteristic curves and a characteristic field, and for comparing the actual condition of the vehicle with a predetermined desired condition for the determination of a critical condition of the vehicle on the basis of characteristic curves, said means for initiating at least one of corrective and protective measures including means for generating signals denoting a condition other than said desired condition of the vehicle.

28. The apparatus of claim 27, wherein at least one of said actual and desired conditions is ascertained by said control unit on the basis of at least one of a plurality of signals denoting the speed of said assembly, the position of a first brake, the position of a second brake, the RPM of the prime mover, the position of a load lever of the vehicle, the gradient of the load lever, the position of a throttle valve for the prime mover, the time of fuel injection into the cylinders of the engine of said prime mover, the input RPM of said assembly, the position of a tachomeer, the position of said device, the torque being transmitted by said system and the torque which is transmittable by said system.

29. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value, said signals denoting the magnitude of transmitted torque including at least one of a plurality of signals denoting the RPM of the prime mover, the position of a load lever, the position of a throttle valve and the fuel injection time, said control unit having means for carrying out at least one of operations including (i) processing said at least one of said plurality of signals for the purpose of ascertaining the magnitude of transmitted torque and (ii) ascertaining the magnitude of transmitted torque on the basis of data in at least one characteristic field in at least one memory of said control unit.

30. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said signal supplying components including at least one sensor arranged to generate signals denoting the selected speed of said assembly and said at least one sensor including a member arranged to monitor the position of at least one movable part of said assembly, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value.

31. Apparatus for regulating the operation of a torque transmission system having heat generating friction surfaces which are slidable relative to each other, which is installed in a power train between a prime mover and a variable speed assembly in a motor vehicle, comprising an adjustable device operable to select the torque which is transmittable by said system; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, the condition of the vehicle being indicated by at least one of signals supplied by at least one of (i) a sensor and (ii) at least one electronic circuit, said control unit including means for ascertaining on the basis of said signals and as a function of time a friction energy input at said friction surfaces and means for calculating at least one temperature of said system, for comparing said at least one calculated temperature with at least one threshold value, and for carrying out at least one of a plurality of undertakings including generating output signals denoting excessive thermal stressing of said system and initiating at least one of corrective and protective measures when the at least one calculated temperature exceeds the at least one threshold value.

32. The apparatus of claim 31, wherein said control unit further includes a central computer which processes said at least one of signal supplied by said at least one of (i) a sensor and (ii) at least one electronic circuit.

33. The apparatus of claim 31, wherein the condition of said vehicle is ascertainable from at least one of a plurality of signals denoting the RPM of said prime mover, the input RPM of said assembly, the RPM of the wheels of said vehicle, the position of a load lever, idling of said prime mover, an engaged condition of said system, the torque of the prime mover, the magnitude of torque being transmissible by said system, the selected speed of said assembly, the intended selection of said speed, the fuel injection time, the stage of operation of the vehicle, and the position of at least one brake.

34. The apparatus of claim 31, wherein said condition of the vehicle includes a starting condition which is detected and indicated on the basis of signals denoting a signal representing an actual position of a load lever, a signal denoting a selected speed of said assembly, a signal denoting a difference between an RPM of said prime mover and an input RPM of said assembly, and a signal denoting that said input RPM is less than an idling RPM of said prime mover.

35. The apparatus of claim 31, wherein said condition of the vehicle includes a starting condition and said assembly has a reverse speed, first and second forward speeds and at least one additional forward speed, said control unit including means for generating first output signals denoting the selection of one of said reverse, first forward and second forward speeds and second output signals denoting the selection of said at least one additional forward speed in the starting condition of said vehicle.

36. The apparatus of claim 31, wherein said condition of the vehicle includes starting and other than starting conditions and said extent of slip is determined by said control unit on the basis of monitoring differences between a prime mover RPM and an input RPM of said assembly, said control unit further comprising means for indicating the condition of said vehicle as other than starting condition in response to a reduction of the monitored difference between said prime mover RPM and said input RPM of said assembly below a predetermined threshold value.

37. The apparatus of claim 36, wherein said predetermined threshold value is less than 70 RPM.

38. The apparatus of claim 36, wherein said predetermined threshold value is about 50 RPM.

39. The apparatus of claim 36, wherein said predetermined threshold value is about 20 RPM.

40. A method of regulating the operation of a torque transmission system having heat generating friction surfaces, with a regulating device which is operable by a control unit, comprising the steps of transmitting to the control unit signals denoting at least the magnitude of torque being transmitted by the system, the extent of slip of friction surfaces relative to each other, the condition of the system and the selected speed of a variable-speed assembly receiving torque from the system; utilizing at least one of said signals to influence the input of energy by the control unit into the friction surfaces of the system; calculating the temperature of at least a portion of the system as a function of time; comparing the calculated temperature with a threshold value; and utilizing the control unit to regulate the operation of the system under at least one of the circumstances including (a) detection of a calculated temperature which exceeds the threshold value and (b) starting of a prime mover for the system at a speed of the variable-speed assembly above a predetermined maximum starting speed, said utilizing step including generating at least one signal for at least one of (a) indication of excessive thermal stressing and (b) initiation of a corrective undertaking, and selecting for the torque transmission system a mode of operation which varies as at least one of (a) a periodical and (b) an aperiodical function of time to result in fluctuations of transmitted torque.

41. A method of regulating the operation of a torque transmission system having heat generating friction surfaces, with a regulating device which is operable by a control unit, comprising the steps of transmitting to the control unit signals denoting at least the magnitude of torque being transmitted by the system, the extent of slip of friction surfaces relative to each other, the condition of the system and the selected speed of a variable-speed assembly receiving torque from the system; utilizing at least one of said signals to influence the input of energy by the control unit into the friction surfaces of the system; calculating the temperature of at least a portion of the system as a function of time; comparing the calculated temperature with a threshold value; and utilizing the control unit to regulate the operation of the system under at least one of the circumstances including (a) detection of a calculated temperature which exceeds the threshold value and (b) starting of a prime mover for the system at a speed of the variable-speed assembly above a predetermined maximum starting speed, said utilizing step including generating at least one signal denoting at least one of excessive energy input, excessive monitored temperature, excessive thermal stressing of at least a portion of the torque transmission system, initiation of a corrective undertaking, and excessive wear at least upon the torque transmission system.

42. Apparatus for regulating the operation of s torque transmission system including a friction clutch having a rotary flywheel, a rotary pressure plate and a rotary clutch disc between said flywheel and said pressure plate, said pressure plate including a plurality of masses in heat exchanging relationship with each other, said flywheel and said pressure plate and said clutch disc having heat generating friction surfaces which are slidable relative to each other and said friction clutch being installed in a power train between a prime mover and a variable speed assembly in a motor vehicle, comprising an adjustable device operable to select the torque which is transmitted by said friction clutch; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating the temperature of said pressure plate, for comparing the calculated temperature of said pressure plate with at least one threshold value, and for carrying out at least one of a plurality of undertakings incuding generating output signals denoting excessive thermal stressing of said friction clutch and initiating at least one of corrective and protective measures when the calculated temperature of said pressure plate exceeds the at least one threshold value, the input of said friction energy taking place at said friction surfaces in response to rotation of said flywheel and said pressure plate relative to said clutch disc and said friction energy being divided into a plurality of branches including a first branch entailing a heating of said flywheel and at least one second branch entailing a heating of said pressure plate.

43. Apparatus for regulating the operation of a torque transmission system including a friction clutch having a rotary flywheel, a rotary pressure plate and a rotary clutch disc between said flywheel and said pressure plate, said pressure plate including a plurality of masses and fixed or temperature-dependent heat transmitting connecting means between said masses, said flywheel and said pressure plate and said clutch disc having heat generating friction surfaces which are slidable relative to each other and said friction clutch being installed in a power train between a prime mover and a variable speed assembly in a motor vehicle, comprising an adjustable device operable to select the torque which is transmittable by said friction clutch; and means for adjusting said device including a control unit having input means connected with at least one of a plurality of signal supplying components for supplying signals denoting at least one of several variable parameters indicating the condition of the vehicle, the magnitude of transmitted torque and the extent of slip of the friction surfaces relative to each other, said control unit including means for ascertaining on the basis of said signals and as a function of time a friction energy input at said friction surfaces and means for calculating the temperature of said pressure plate, for comparing the calculated temperature of said pressure plate with at least one threshold value, and for carrying out at least one of a plurality of undertakings including generating output signals denoting excessive thermal stressing of said friction clutch and initiating at least one of corrective and protective measures when the calculated temperature of said pressure plate exceeds the at least one threshold value, the input of said friction energy taking place at said friction surfaces in response to rotation of said flywheel and said pressure plate relative to said clutch disc and said friction energy being divided into a plurality of branches including a first branch entailing a heating of said flywheel and at least one second branch entailing a heating of said pressure plate.

* * * * *